(12) United States Patent
Ochi et al.

(10) Patent No.: US 7,791,886 B2
(45) Date of Patent: Sep. 7, 2010

(54) HEAT-DISSIPATING STRUCTURE FOR AN OPTICAL ISOLATOR

(75) Inventors: Yuzo Ochi, Yokohama (JP); Syoji Kubomura, Yokohama (JP); Masayuki Fujii, Yokohama (JP)

(73) Assignee: Shinkosha Co., Ltd., Yokohama-shi, Kanagawa (JP)

( * ) Notice: Subject to any disclaimer, the term of this patent is extended or adjusted under 35 U.S.C. 154(b) by 324 days.

(21) Appl. No.: 11/990,776

(22) PCT Filed: Dec. 20, 2006

(86) PCT No.: PCT/JP2006/325991

§ 371 (c)(1),
(2), (4) Date: Feb. 21, 2008

(87) PCT Pub. No.: WO2008/023450

PCT Pub. Date: Feb. 28, 2008

(65) Prior Publication Data

US 2009/0091890 A1 Apr. 9, 2009

(30) Foreign Application Priority Data

Aug. 25, 2006 (JP) ............................... 2006-228742

(51) Int. Cl.
*H05K 7/20* (2006.01)
*H01S 3/04* (2006.01)
*G02F 1/09* (2006.01)

(52) U.S. Cl. ....................... 361/704; 361/703; 359/280; 359/484; 372/36; 372/703

(58) Field of Classification Search .................. 361/703, 361/704; 165/185; 359/280–284, 484; 372/34–36, 372/703

See application file for complete search history.

(56) References Cited

U.S. PATENT DOCUMENTS 3,523,718 A 8/1970 Craw (Continued)

FOREIGN PATENT DOCUMENTS

JP H05-053081 3/1993

(Continued)

OTHER PUBLICATIONS

English translation of JP 2005-043853.*

*Primary Examiner*—Jayprakash N Gandhi
*Assistant Examiner*—Robert J Hoffberg
(74) *Attorney, Agent, or Firm*—Manabu Kanesaka

(57) ABSTRACT

A heat-dissipating structure for an optical isolator is capable of suppressing an increase in temperature caused by light absorption in a magnetic garnet crystalline film by radiation fins extending from the inside of an external heat conducting cover. The heat-dissipating structure for the optical isolator is formed by housing a magnetic garnet crystalline film (12), first and second heat conductive plates (6, 7, 8 and 9) and magnet 18 in the external heat conducting cover, placing the radiation fins (10 and 11) on the second heat conductive plate, attaching the first heat conductive plates (6 and 7) onto either side of the magnetic garnet crystalline film, arranging the second heat conductive plates (8 and 9) on the outer surface of the first heat conductive plates, and passing the radiation fins through guide openings (2a and 2b) in the isolator holder 2 to the outside of the external heat conducting cover from the extracting opening (3c) to be brought into contact with the outer grooves (4d and 5d).

11 Claims, 20 Drawing Sheets

U.S. PATENT DOCUMENTS

| | | | | |
|---|---|---|---|---|
| 3,697,151 | A * | 10/1972 | Skolnick et al. | 359/484 |
| 5,363,391 | A * | 11/1994 | Matthews et al. | 372/36 |
| 5,715,080 | A * | 2/1998 | Scerbak | 359/281 |
| 5,978,135 | A * | 11/1999 | Abbott et al. | 359/484 |
| 7,259,913 | B2 * | 8/2007 | Iida | 359/484 |
| 7,515,780 | B2 * | 4/2009 | Chang et al. | 385/11 |
| 2009/0290213 | A1 * | 11/2009 | Yamazaki | 359/484 |

FOREIGN PATENT DOCUMENTS

| | | | |
|---|---|---|---|
| JP | H07-281129 | | 10/1995 |
| JP | 2004-361757 | A | 12/2004 |
| JP | 2005-025138 | | 1/2005 |
| JP | 2005-043853 | | 2/2005 |
| JP | 2005037753 | A * | 2/2005 |
| JP | 2006-030442 | | 2/2006 |
| JP | 2006030442 | A * | 2/2006 |
| JP | 2006-126582 | | 5/2006 |
| JP | 2006133552 | A * | 5/2006 |
| JP | 2007065289 | A * | 3/2007 |

* cited by examiner

F I G. 8
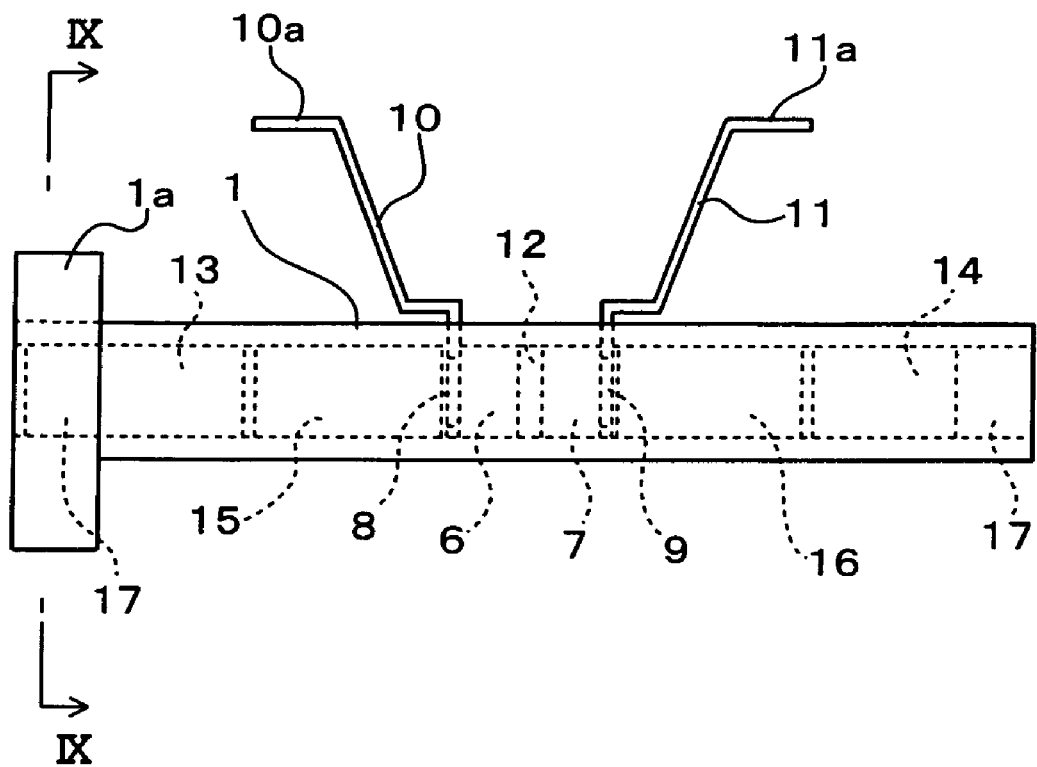
F I G. 9
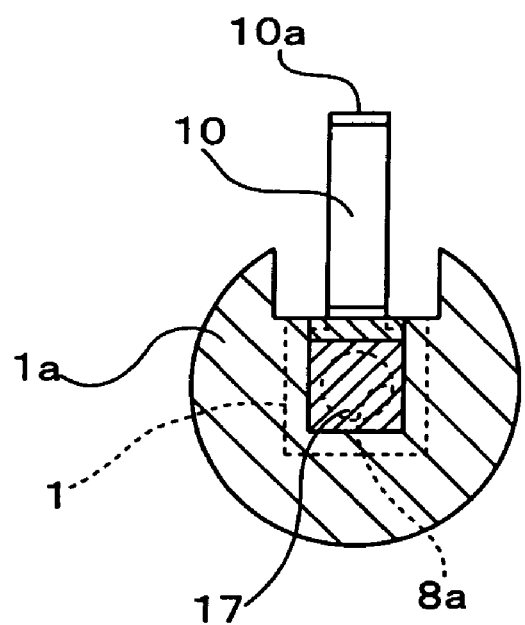

F I G.15
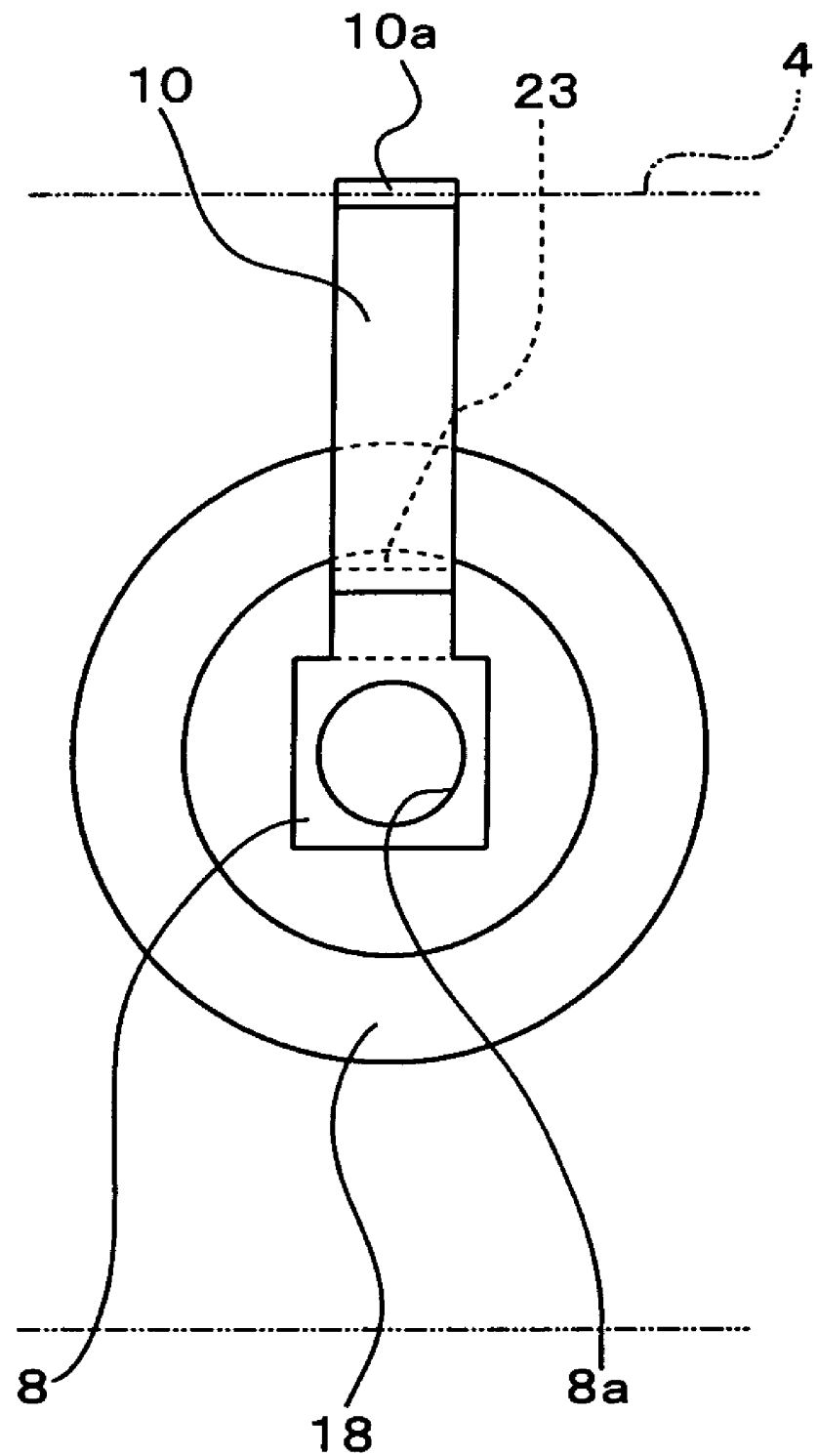

HEAT-DISSIPATING STRUCTURE FOR AN OPTICAL ISOLATOR

TECHNICAL FIELD

This invention relates to a heat-dissipating structure for an optical isolator, which serves to suppress an increase in temperature caused by light absorption in a Faraday rotator used for the optical isolator.

BACKGROUND ART

A polarization control module such as an optical isolator in the analytical medical field or other technical fields using a high-energy laser has recently been required to fully cope with incidence of high power light. The reason comes from the fact that when light possessing large power such as of 730 nm to 800 nm or 1000 nm to 1200 nm in the near-infrared wavelength range enters into the optical isolator using garnet crystal for Faraday rotator having a function of rotating polarization of light, the optical property of a Faraday rotator is disadvantageously caused to deteriorate due to elevation in heat produced by light absorption in the aforementioned garnet crystal.

To achieve a solution to the conventional problem as described above, there have been proposed a high-power optical isolator in Japanese Published Unexamined Application HEI 7-281129(A1), a short-wavelength high-power optical Isolator in Japanese Published Unexamined Application No. 2005-25138(A1), and an optical isolator in Japanese Published Unexamined Application No. 2005-43853(A1).

A heat-dissipating structure in the short-wavelength high-power optical Isolator (referred to as "Conventional Art 1") disclosed in Japanese Published Unexamined Application No. 2005-25138(A1) will be described hereinafter as one example.

A cylindrical magnet and ring-shaped heat sink in this conventional heat-dissipating structure are housed within a case, bringing their outer peripheries in contact with the inner periphery of the case. The Faraday rotator is disposed in the cylindrical magnet. The Faraday rotator has one side or both sides secured on one side of the aforementioned heat sink, and the heat sink has the aforementioned one side secured on the side surface of the aforementioned magnet. In the short-wavelength high-power optical Isolator, when high power light enters the Fadaday rotator, the Faraday rotator produces heat by light absorption in an optical signal transmissive part of the rotator, allowing the heat thus produced to radiate to the magnet through the heat sink. Thus, the aforementioned Faraday rotator in the short-wavelength high-power optical Isolator is attained to increase its heat dissipation efficiency and restrain temperature elevation.

Next, the heat-dissipating structure (hereinafter referred to as "Conventional Art 2") described in Japanese Published Unexamined Application No. 2005-43853(A1) will be described. The Faraday rotator in this heat-dissipating structure is disposed within a cylindrical magnet in an external holder. The both side surfaces of the Faraday rotator come in a heat transfer member of sapphire crystal. A void part between the inner periphery of the magnet and the outer peripheries of the Faraday rotator and the heat transfer member is filled with filler having thermal conductivity. In this conventional optical isolator, when high power light enters the Fadaday rotator, the Faraday rotator produces heat by light absorption in an optical signal transmissive part of the rotator, allowing the heat thus produced to radiate from the heat transfer member to the magnet through the filler and then be transmitted from the outer periphery of the magnet to the inner periphery of the external holder.

The aforementioned Conventional Art 1 and Conventional Art 2 have the following problems.

That is, the aforementioned Conventional Art 1 disadvantageously has the heat sink in direct contact with the magnet. Also, the aforementioned Conventional Art 2 has the filler in direct contact with the magnet. Thus, the heat produced by light absorption in the optical signal transmissive part of the Faraday rotator in the respective Conventional Art 1 and Conventional Art 2 is transferred to the magnet. Specifically, when the produced heat is high in temperature, the high-temperature heat causes the magnetic field of the magnet to decrease, consequently to subject to affect the function of the optical isolator. Furthermore, the heat produced in the optical isolator is released there in the optical isolator, thus to thermally affect the elements of the optical isolator, so the optical isolator has required improvement to optical characteristics.

The present invention seeks to provide a heat-dissipating structure for an optical isolator capable of suppressing an increase in temperature of a Faraday element without affecting the function of the optical isolator and gaining stable characteristics.

DISCLOSURE OF THE INVENTION

A heat-dissipating structure for an optical isolator according to the present invention comprises an isolator holder within which component parts of an optical isolator body such as a magnetooptical crystalline film, a polarizer and a magnet are arranged respectively, an external heat conducting cover for the aforesaid isolator holder, first and second heat conductive members provided within the aforesaid isolator holder, and flexible radiation fins formed at a part of the second heat conductive members. The isolator holder has guide openings for the radiation fins, which open toward the aforementioned external heat conducting cover. The external heat conducting cover has an extracting opening formed on the side of the guide openings for extracting the radiation fins. The aforementioned first heat conductive members are formed on at least one side of the aforementioned magnetooptical crystalline film. The aforementioned second heat conductive members are placed adjacent to the first heat conductive members and opposite to the aforementioned magnetooptical crystalline film across the first heat conductive members and has a hole in a light path. The aforementioned radiation fins extend laterally leaving a gap relative to the aforementioned magnet to be extracted from the guide openings to the outside of the external heat conducting cover through the extracting opening and have their outer end portions in contact with the outside of the external heat conducting cover.

In the heat-dissipating structure for the optical isolator according to the invention, the first heat conductive members are disposed on the both surface of the magnetooptical crystalline film so as to hold the magnetooptical crystalline film therebetween.

To increase its heat dissipation efficiency, the heat-dissipating structure for the optical isolator according to the invention is featured in that two units of the aforesaid magnetooptical crystalline film and the first heat conductive members on the both side of the film are disposed adjacent to each other, that the second heat conductive members are disposed between the both units and on the outside of the respective units, and that more than one second heat conductive member is placed between the both units, or that more than one second heat conductive member is placed between the both units and on the outside of the respective units.

According to the heat-dissipating structure for the optical isolator of the invention, heat produced in the magnetooptical crystalline film can be transferred from the first heat conductive members to the radiation fins through the second heat conductive members, thereby to be released out of the external heat conducting cover, so that the heat produced in the magnetooptical crystalline film can be effectively dissipated outward. Thus, the optical isolator with stable optical characteristics capable of suppressing an increase in temperature can be materialized.

BRIEF DESCRIPTION OF THE DRAWINGS

FIG. 8 is a front view showing an element holding case in the heat-dissipating structure for an optical isolator according to the invention.

FIG. 9 is a cross section taken along line IX-IX in FIG. 8.

FIG. 15 is a left side view of FIG. 14.

BEST MODE FOR CARRYING OUT THE INVENTION

Figure 1:
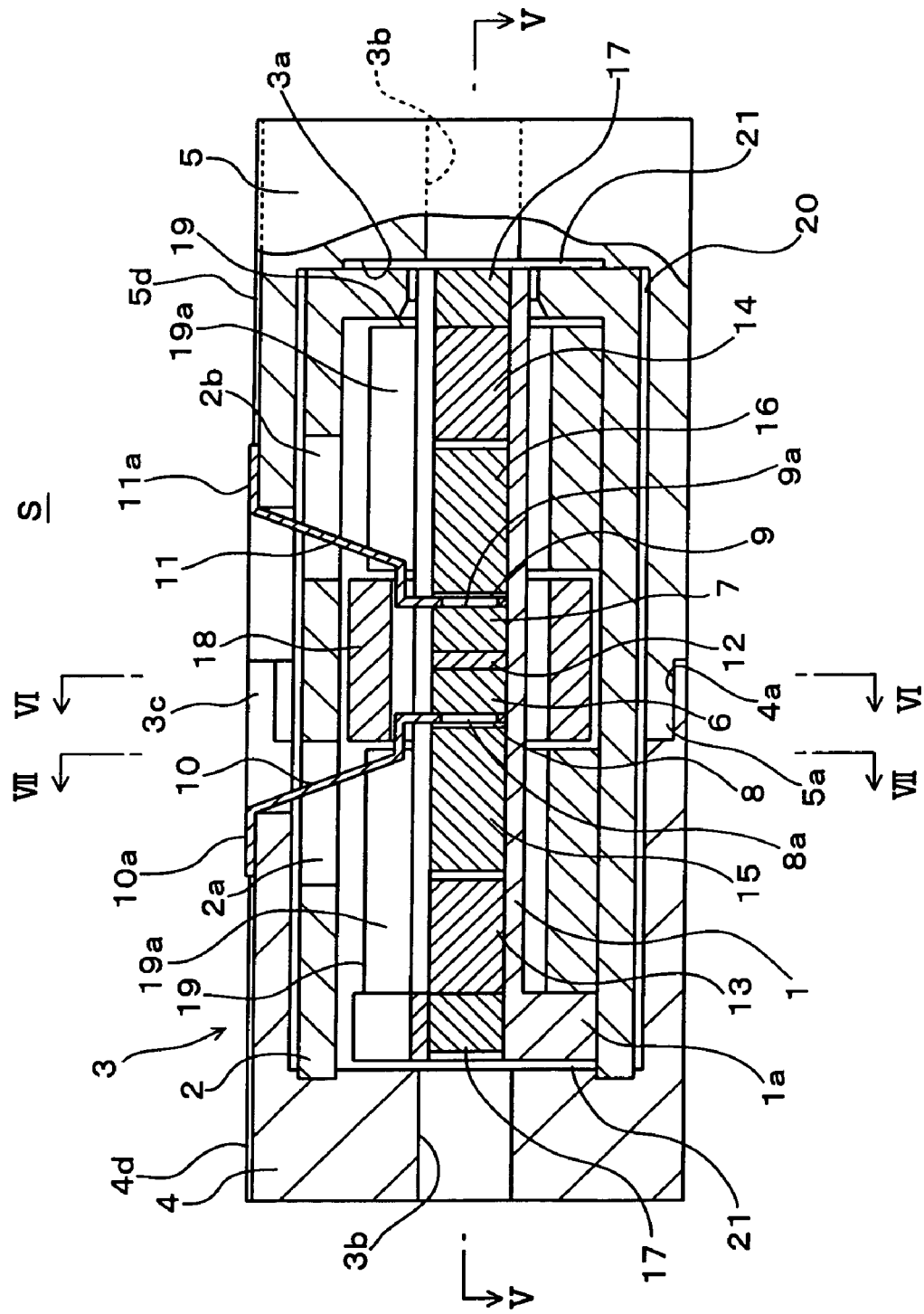
FIG. 1 is a front view showing a heat-dissipating structure for an optical isolator according to the present invention, in which an external heat conducting cover is partially cut to reveal the interior.

A heat-dissipating structure for an optical isolator according to the present invention will be described hereinafter with reference to the accompanying drawings.

As shown in FIG. 1 through FIG. 4, the optical isolator S comprises an isolator holder 2 incorporating an element holding case 1, an external heat conducting cover 3 covering the isolator holder, first heat conductive members 6 and 7, second heat conductive members 8 and 9, and radiation fins 10 and 11 extending from the second heat conductive members.

Figure 5:
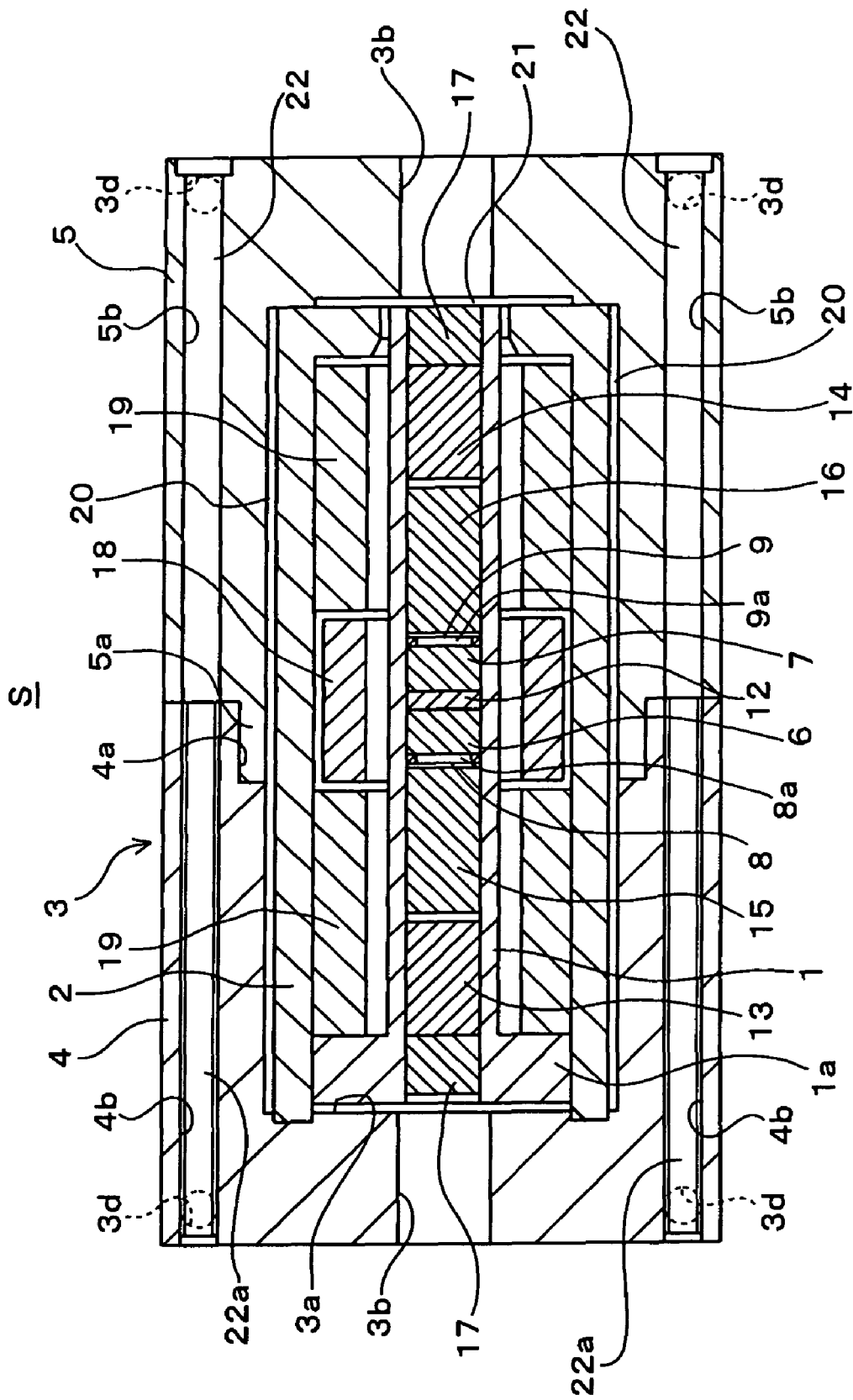
FIG. 5 is a cross section taken along line V-V in FIG. 1.

The element holding case 1 has an upper opening to be formed like a groove in section as shown in FIG. 1 and FIG. 5 to FIG. 9 and is provided at one end (left end in FIG. 8) with a lid 1a. As shown in FIG. 1 and FIG. 5, the element holding case 1 steadily houses a magnetic garnet crystalline film 12 as a magnetooptical crystalline film, which is one of the component elements of the optical isolator S, first heat conductive plates 6 and 7 of the first heat conductive members, second heat conductive plates 8 and 9 of the second heat conductive members, first and second lenses 13 and 14, and first and second doubly refracting crystal plates 15 and 16.

The beam power density of a beam incident on the optical isolator S is determined to 100 W/cm$^2$ or more. The component elements of the optical isolator S are set in array along a light path of the forward beam in such a state the first lens 13, the first doubly refracting crystal plate 15, one of second heat conductive plates 8, one of the first heat conductive plates 6, magnetic garnet crystalline film 12, the other first heat conductive plate 7, the other second heat conductive plate 9, the second doubly refracting crystal plate 16 and the second lens 14 are lined up in order in a direction from left to right as shown in FIG. 1. Each of the component elements 6, 7, 8, 9, 12, 13, 14, 15 and 16 are stably held within the element holding case 1 by translucent stoppers placed at either end inside the case.

As shown in FIG. 1, the magnetic garnet crystalline film 12 is placed at the center portion of the outside of the element holding case 1 and surrounded by the cylindrical magnet 18.

Figure 4:
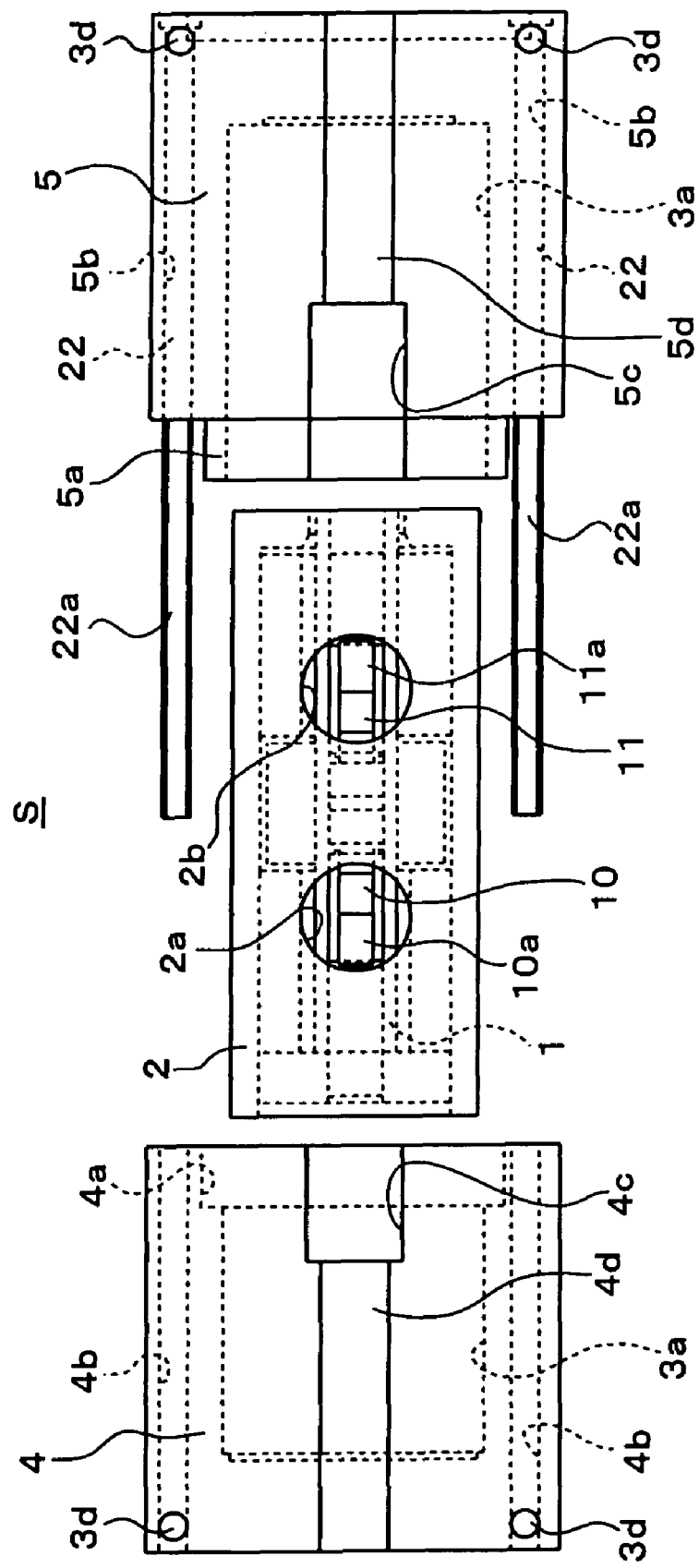
FIG. 4 is an exploded plan view showing the heat-dissipating structure for an optical isolator according to the invention on a reduced scale.
Figure 6:
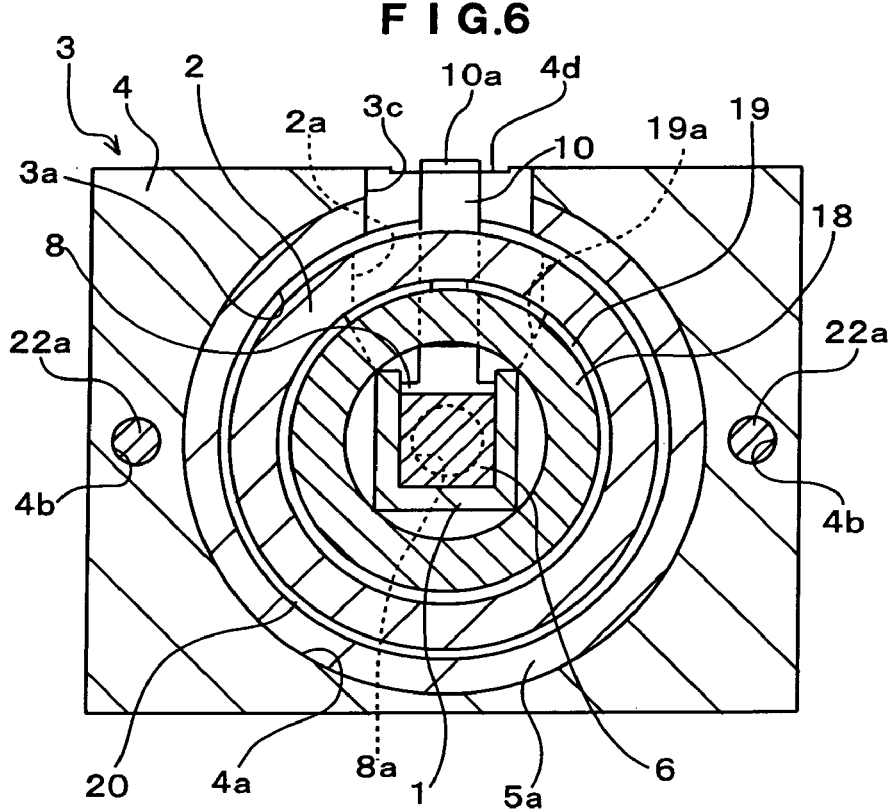
FIG. 6 is an enlarged cross section taken along line VI-VI in FIG. 1.
Figure 10:
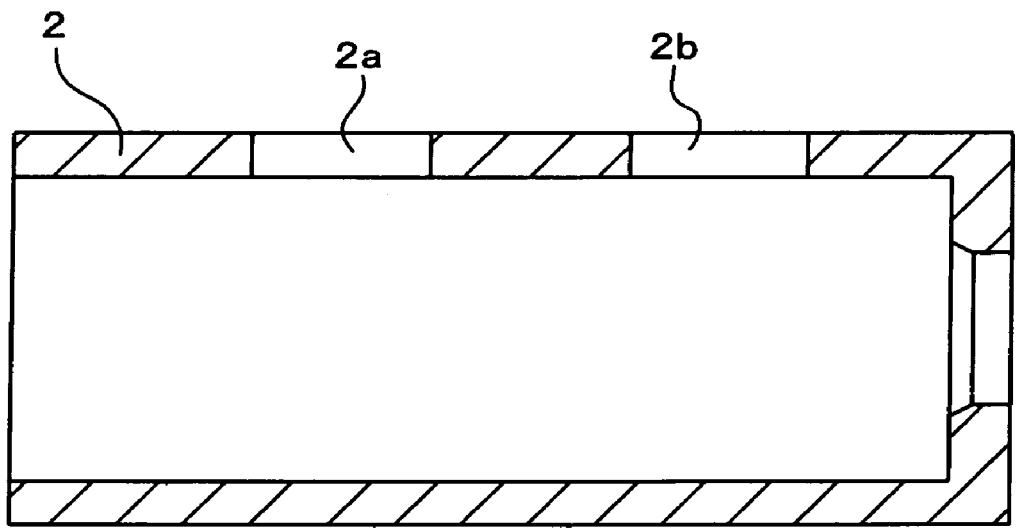
FIG. 10 is a cross section showing an isolator holder in the heat-dissipating structure for an optical isolator according to the invention.
Figure 11:
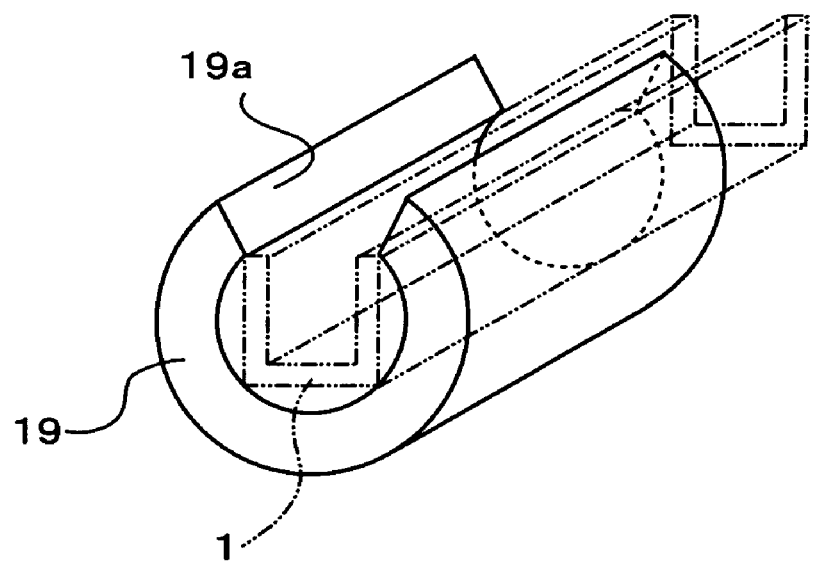
FIG. 11 is a perspective view showing a spacer in the heat-dissipating structure for an optical isolator according to the invention.

The isolator holder 2 is formed in a pipe shape of material having low thermal conductivity such as stainless steel, as shown in FIG. 1 and FIG. 5 to FIG. 7. The isolator holder 2 has two guide openings 2a and 2b for the radiation fins in the upper surface thereof as shown in FIG. 4 and FIG. 10. Each of the guide openings 2a and 2b is formed in a circle as shown in FIG. 4. The magnet 18 is disposed on the center portion within the isolator holder 2, as shown in FIG. 1 and. FIG. 6. Onto the both sides of the magnet, spacers 19 are attached. Each spacer 19 is formed in a ring shape as shown in FIG. 11 and has an opening groove 19a in the upper part thereof. The opening groove 19a is formed like an expanding slot over the entire length of the spacer 19. The opening groove 19a is formed by cutting the spacer 19 toward the center of axle of the spacer. The spacers 19 each have a C-shaped appearance cross section with the opening groove 19a. The opening groove 19a has a width enough to permit the radiation fins 10 and 11 described later to pass therethrough. The spacers 19 contribute to stably hold the magnet 18 in the isolator holder 2.

Figure 7:
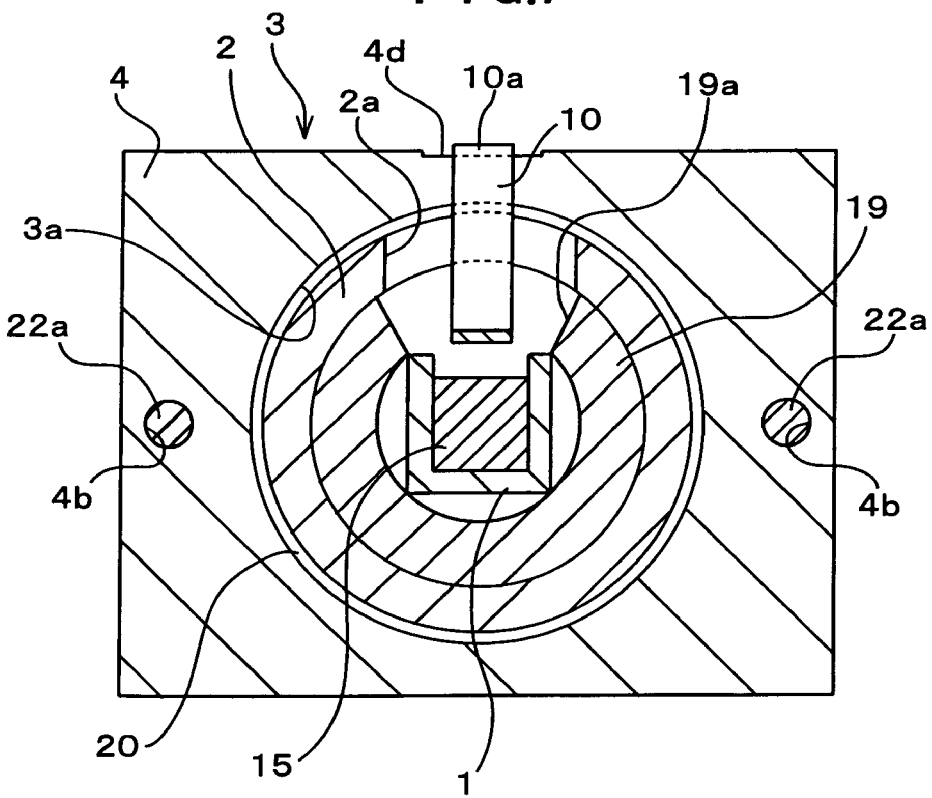
FIG. 7 is an enlarged cross section taken along line VII-VII in FIG. 1.

The isolator holder 2 is housed within a holder accommodating space 3a in the external heat conducting cover 3 as shown in FIG. 1 and FIG. 7. As for the state of accommodating the isolator holder 2, a room space 20 is made between the outer periphery of the isolator holder 2 and the inner periphery of the external heat conducting cover 3. Further, a room space 21 is made between the external heat conducting cover 3 and the lateral side of the isolator holder 2 except for upper and lower portions in contact with the lateral sides of the isolator holder, as shown in FIG. 1.

The room spaces 20 and 21 have a function of preventing heat of the external heat conducting cover 3 from being transferred to the isolator holder 2.

The external heat conducting cover 3 is formed by combining a first external heat conducting cover element 4 and a second external heat conducting cover element 5 as shown in FIGS. 1 to 5. The first external heat conducting cover element 4 and second external heat conducting cover element 5 are respectively formed in a cap. The first and second external heat conducting cover elements 4 and 5 are made of heat conductive material such as copper, carbon, and aluminum or surface-treated with alumite. In the embodiment of the invention, they are made of copper by way of example.

Figure 2:
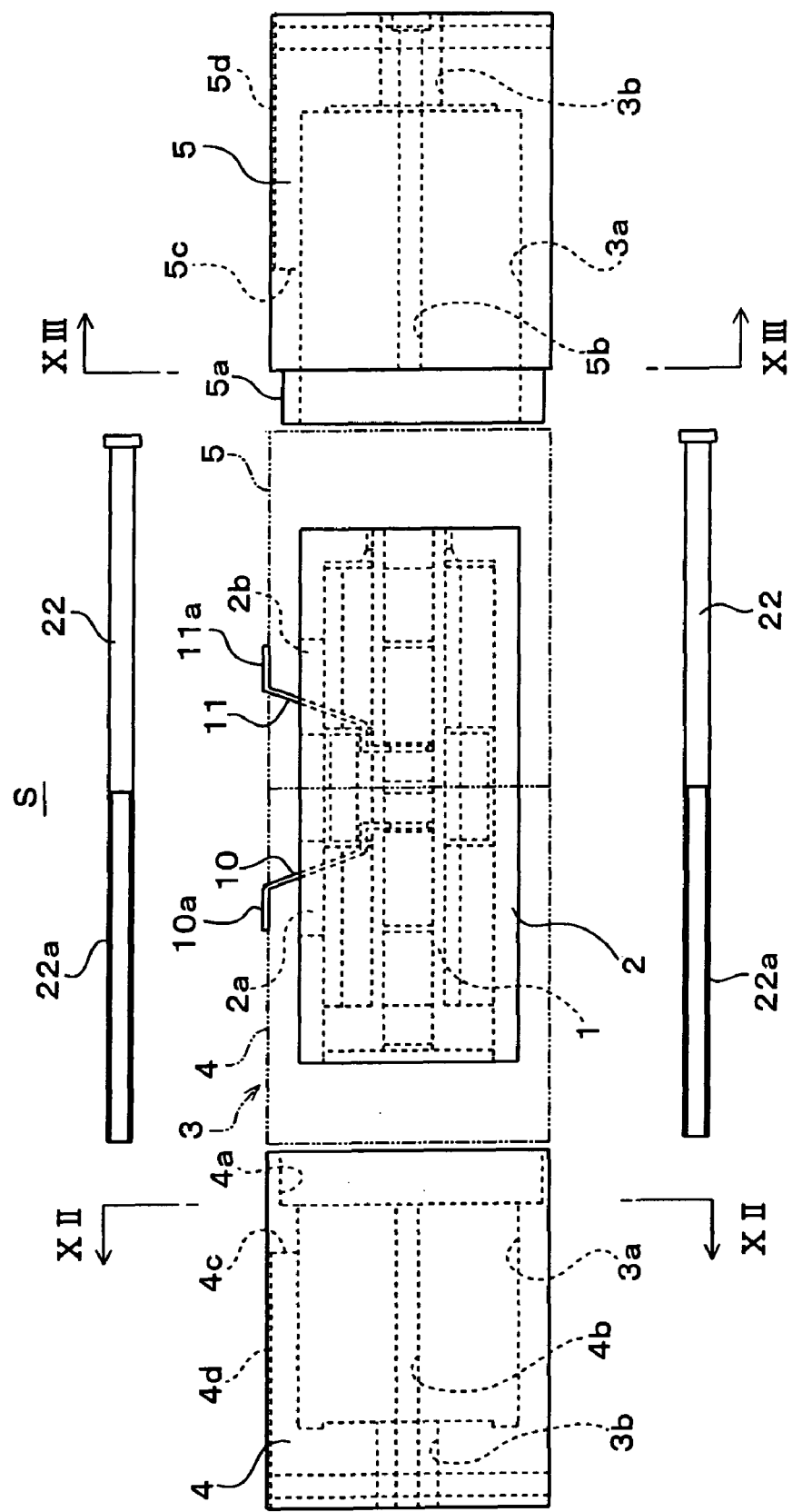
FIG. 2 is an exploded front view showing the heat-dissipating structure for an optical isolator according to the invention on a reduced scale.
Figure 12:
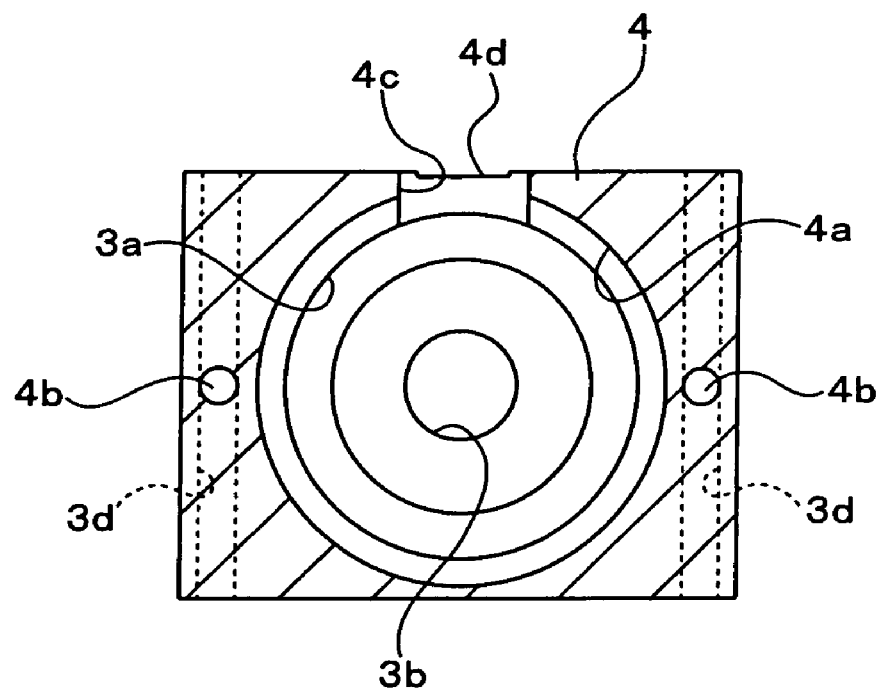
FIG. 12 is an enlarged cross section taken along line XII-XII in FIG. 2.
Figure 13:
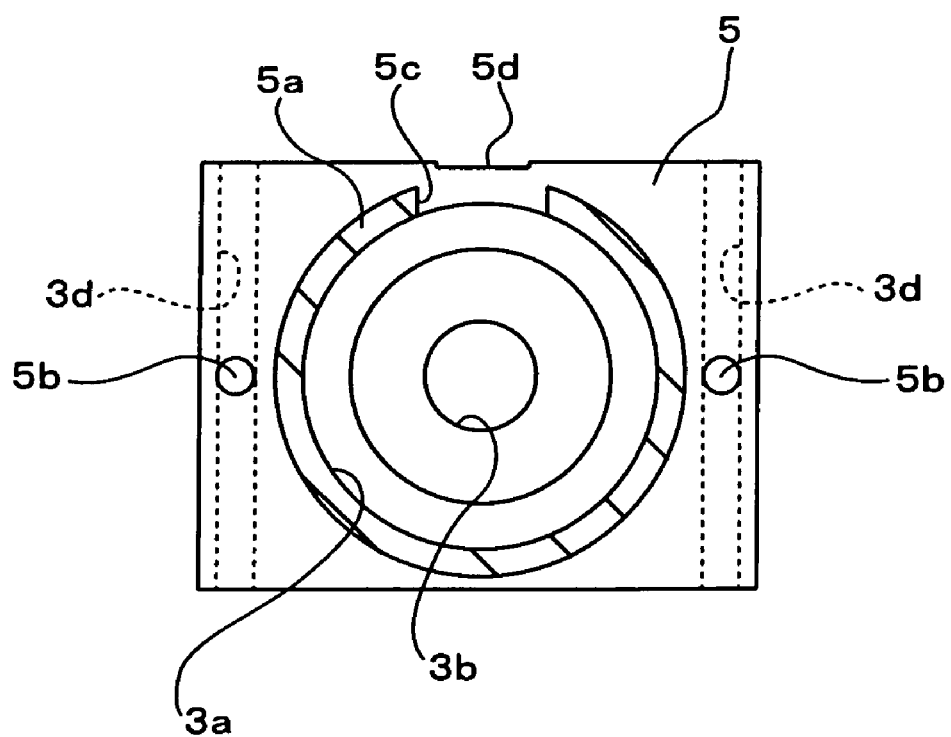
FIG. 13 is an enlarged cross section taken along line XIII-XIII in FIG. 2.

The first external heat conducting cover 4 placed on the left side of FIG. 2 and FIG. 4 is provided with engaging holes 4a (FIG. 12). The second external heat conducting cover 5 placed on the right side of FIG. 2 and FIG. 4 has engaging projection rods 5a (FIG. 13) to be fitted into the engaging holes 4a. The first external heat conducting cover element 4 and the second external heat conducting cover element 5 are fittingly united with each other by fitting the engaging projection rods 5a into the engaging holes 4a. Thus, the external heat conducting cover 3 is composed by uniting the external heat conducting cover elements as shown in FIG. 1 and FIG. 5 with the holder accommodating space 3a defined inside the external heat conducting cover.

The first external heat conducting cover element 4 and the second external heat conducting cover element 5 are fixed in one body by bolts 22 as shown in FIG. 2, FIG. 4 and FIG. 5. The female threaded bolt-holes 4b are bored in the both side portions of the first external heat conducting cover element 4 in the left and right direction of FIG. 5. The bolt-holes 5b are bored opposite to the bolt-holes 4b in the both side portions of the second external heat conducting cover element 5 in the left and right direction of FIG. 5. The bolts 22 are inserted through the bolt-holes 5b in the second external heat conducting cover element 5 into the bolt-holes 4b in the first external heat conducting cover element 4 so as to engage the male threads 22a of the bolts with the female threads in the bolt-holes 4b, thereby to securely unite the first external heat conducting cover element with the second external heat conducting cover element.

As shown in FIG. 1 and FIG. 5, beam guide holes 3b are formed in the centers of the both side portions of the external conductive cover 3 and reach the holder accommodating space 3a within the external heat conducting cover.

Figure 3:
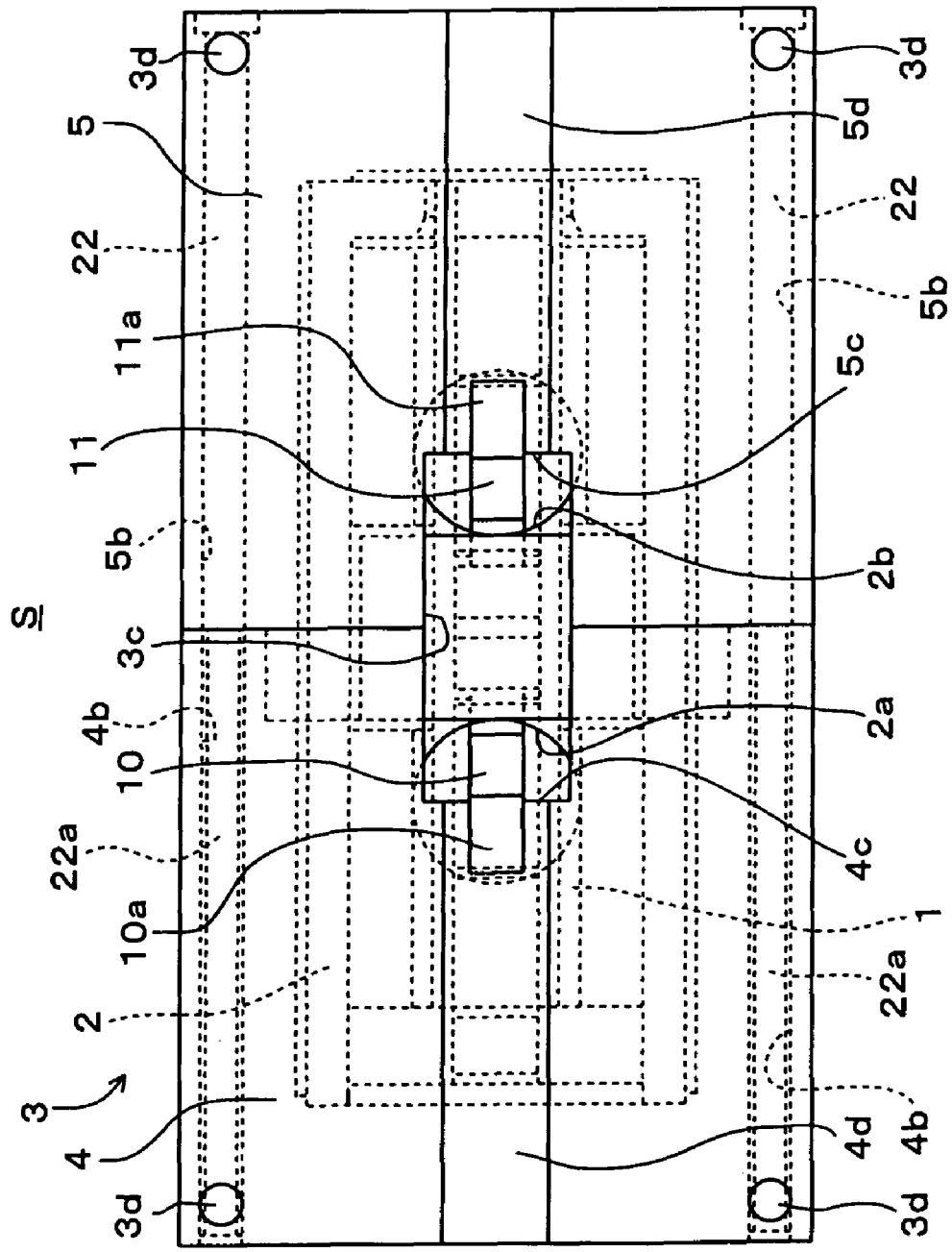
FIG. 3 is a plan view showing the heat-dissipating structure for an optical isolator according to the invention.

As shown in FIG. 1 and FIG. 3, the extracting opening 3c for the radiation fins is formed in the upper center portion of the external heat conducting cover 3. The extracting opening 3c is formed in a rectangular shape as shown in FIG. 3. The extracting opening 3c has a cutout hole 4c having an angular U-shape in the upper plan surface of the first external heat conducting cover 4 shown in FIG. 2, FIG. 4, FIG. 12 and FIG. 13, and a cutout hole 5c formed in the upper portion of the first external heat conducting cover 5 by cutting the body and engaging projection rod 5a.

As shown in FIG. 1 and FIG. 4, outer grooves 4d and 5d are shallow slits formed in the upper portions of the first external heat conducting cover 4 and the second external heat conducting cover 5. The outer grooves 4d and 5d are formed continuously leading to the end portions of the extracting openings 3c and extend to the opposite sides of the extracting openings.

Figure 14:
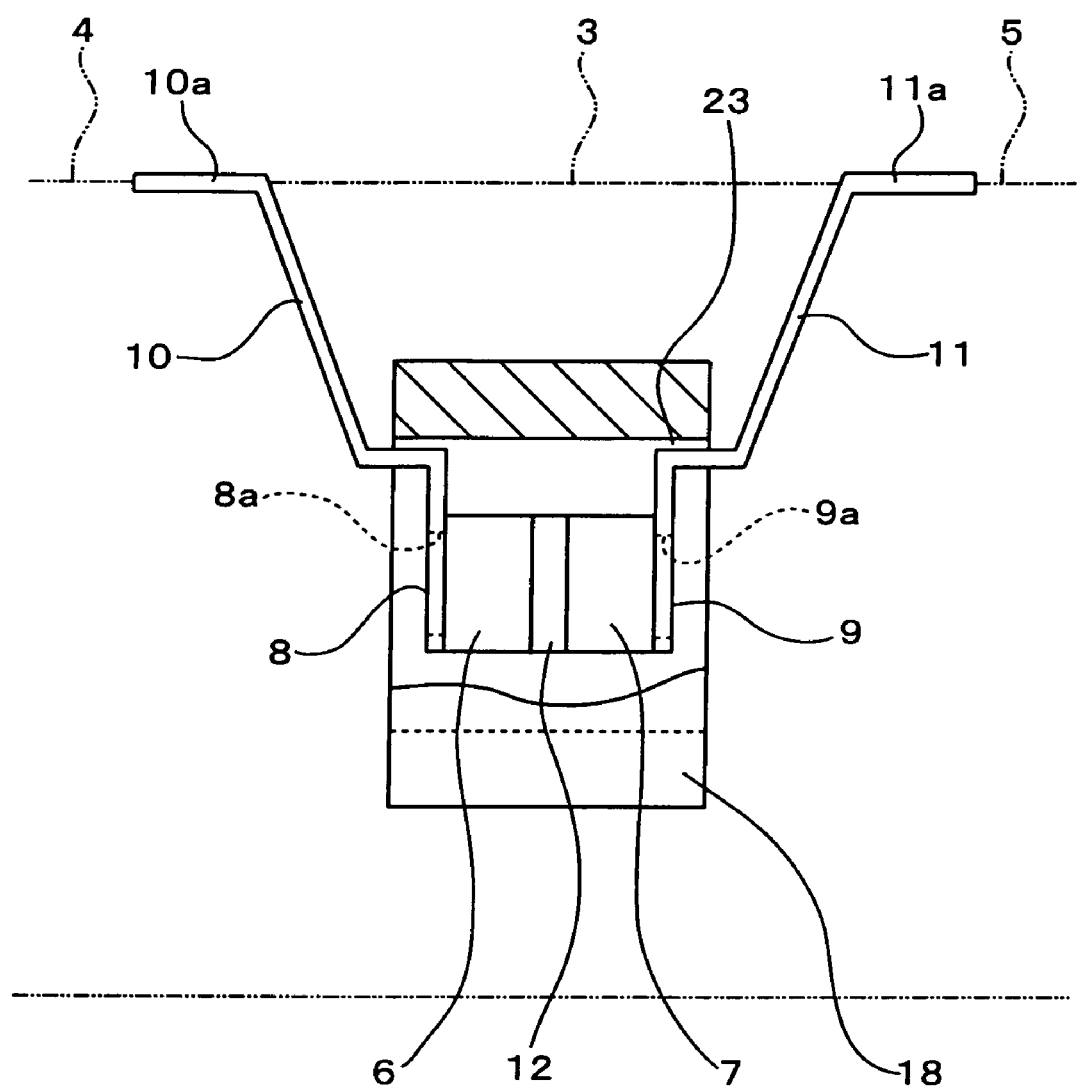
FIG. 14 is a partially cutaway enlarged front view showing the state of attaching a second heat conductive plate.

As shown in FIG. 1, FIG. 5 and FIG. 14, the first heat conductive plates 6 and 7 are joined across the magnetic garnet crystalline film 12 in a sandwich state. That is, the first heat conductive plates 6 and 7 are attached one to either side of the magnetic garnet crystalline film 12.

The first heat conductive plates 6 and 7 are arbitrarily selected from the following heat conductive materials (1) to (9).

(1) Gadolinium-gallium-garnet (GGG)
(2) Oxidized titanium ($TiO_2$)
(3) Sapphire ($Al_2O_3$)
(4) Polytype SIC (3C—SiC)
(5) Polytype SIC (4H—SiC)
(6) Polytype SIC (6H—SiC)
(7) Hexagonal aluminum nitride (hex.AlN)
(8) Hexagonal gallium nitride (hex.GaN)
(9) Diamond (C)

In the case of selecting (1) gadolinium-gallium-garnet (hereinafter referred to as "GGG") as the heat conductive material for the first heat conductive plate 6, the other heat conductive plate 7 may be preferable selected from the group of (2) oxidized titanium ($TiO_2$) to (9) diamond (C).

In the case of selecting one from the group of (2) oxidized titanium ($TiO_2$) to (9) diamond (C) as the heat conductive material for the first heat conductive plate 6, it is preferable to select one from the group of (1) GGG to (9) diamond (C) for the other first heat conductive plate 7.

According to the selection as mentioned above, the heat-dissipating structure shown in FIG. 1 has the advantage of being able to remarkably increase coefficient of thermal conductivity and improve heat dissipation capacity in comparison with the structure having the first heat conductive plates 6 and 7 holding the magnetic garnet crystalline film 12 therebetween are made of GGG.

In the illustrated embodiment, the first heat conductive plates 6 and 7 are made of sapphire.

The first heat conductive plates 6 and 7 are joined with the boundary surfaces of the magnetic garnet crystalline film 12 by using binding means such as optical adhesive bonding or pressure bonding means in an optically unabsorbable state.

The magnetic garnet crystalline film 12 and the first heat conductive plates 6 and 7 are placed within the cylindrical magnet 18 (FIG. 1 and FIG. 6). The magnetic garnet crystalline film 12 is a Faraday element.

Next, the second heat conductive plates 8 and 9 and radiation fins 10 and 11 will be described.

As shown in FIG. 14 and FIG. 15, the second heat conductive plates 8 and 9 are disposed outside the first heat conductive plates 6 and 7. As the heat conductive material for the second heat conductive plates 8 and 9, there may be selected copper, silver, gold, carbon or aluminum. The second heat conductive plates 8 and 9 in the illustrated embodiment is made of copper and attached onto one side of the respective first heat conductive plates 6 and 7. The second heat conductive plates 8 and 9 have holes 8a and 9a in their center portions and radiation fins 10 and 11 extending upward therefrom. The holes 8a and 9a are on the light path for the light beam.

The radiation fins 10 and 11 are bendable and integrally formed as one parts of the second heat conductive plates 8 and 9. The radiation fins 10 and 11 are made of copper as well as the second heat conductive plates 8 and 9, so that the fins have high thermal conductivity and can be easily be processed so as to be bent or formed into a desirable shape with ease and maintained in shape.

The radiation fins 10 and 11 are bent horizontally outward, leaving a gap 23 from the magnet without contacting with the inner periphery of the magnet 18, and then extend obliquely upward so as to gradually separate from the side surface of the magnet, as shown in FIG. 14 and FIG. 15. The radiation fins 10 and 11 has the outer end portions 10a and 11a in contact with the outer surface of the external heat conducting cover 3 covering the isolator holder 2 (FIG. 1). The outer end portions 10a and 11a of the radiation fins 10 and 11 come into contact with the bottom surfaces of the outer grooves 4d and 5d in the first external heat conducting cover 4 and the second external heat conducting cover 5 as shown in FIG. 1, FIG. 6 and FIG. 7. The contact of the outer end portions 10a and 11a with the bottom surfaces of the outer grooves is secured by contact compensating means such as thermally conductive adhesive and welding.

Next, the relation among the radiation fins 10 and 11, first heat conductive plates 6 and 7, second heat conductive plates 8 and 9, magnet 18, spacers 19, isolator holder 2 and external heat conducting cover 3 will be described.

As shown in FIG. 1 and FIG. 8, the second heat conductive plates 8 and 9 integral with the radiation fins 10 and 11 are respectively in contact with the first heat conductive plates 6 and 7.

The first heat conductive plates 6 and 7 are in contact with the magnetic garnet crystalline film 12.

Each of the radiation fins 10 and 11 is bent and extends laterally out of the magnet without contacting with the magnet 18 (FIG. 14). As shown in FIG. 1 and FIG. 7, each of the radiation fins 10 and 11 extends upward through the opening groove 19a without contacting with the spacers 19 and further extends upward out of the outer periphery of the isolator holder through the guide openings 2a and 2b in the isolator holder 2 without contacting with the isolator holder (FIG. 2). The radiation fins 10 and 11 have the upper parts extending upward are extracted out of the external heat conducting cover 3 through the extracting opening 3c without contacting with the external heat conducting cover 3 as shown in FIG. 1 and FIG. 3. The outer end portions 10a and 11a of the radiation fins 10 and 11 are bent horizontally and come into contact with the bottom surface of the outer grooves 4d and 5d.

The radiation fins 10 and 11 are extracted out of the external heat conducting cover 3 without contacting with the magnet 18, spacers 19 and isolator holder 2. Thus, the heat produced in the magnetic garnet crystalline film 12 is transferred to the radiation fins 10 and 11 through the first heat conductive plates 6 and 7 and the second heat conductive plates 8 and 9 and directly reaches the outer grooves 4d and 5d of the external heat conducting cover 3 without being transferred to the magnet 18 and the isolator holder 2. Thus, the heat produced in the magnetic garnet crystalline film 12 can steadily be released out of the external heat conducting cover 3 with the simple structure as described above.

As shown in FIG. 1, the forward light beam entering through the first lens 13 passes through the first doubly refracting crystal plate 15, the hole 8a in the second heat conductive plate 8, the first heat conductive plate 6, the magnetic garnet crystalline film 12, the first heat conductive plate 7 and the hole 9a in the second heat conductive plate 9. The magnetic garnet crystalline film 12 produces heat by absorbing the light passing therethrough. The heat produced in the magnetic garnet crystalline film 12 is dissipated to the second heat conductive plates 8 and 9 through the first heat conductive plates 6 and 7 and further released to the outside of the external heat conducting cover 3 through the radiation fins 10 and 12. Thus, the radiation fins serve as cooling means to enhance the thermal radiation effect of the heat-dissipating structure. The heat produced in the magnetic garnet crystalline film 12 is transferred to the first heat conductive plates 6 and 7 at the first stage and further transferred from the second heat conductive plates 8 and 9 to the radiation fins 10 and 11 at the second stage, and eventually, to the outer grooves 4d and 5d of the external heat conducting cover 3. The components constituting the heat conducting path are substantially formed of the first heat conductive plates 6 and 7 and the second heat conductive plates 8 and 9 (including the radiation fins 10 and 11 composing a part of the second heat conductive plates). The heat can smoothly radiate out of the external heat conducting cover 3 through the heat conducting path thus simplified.

The heat-dissipating structure illustrated in FIG. 1 enables the heat produced in the magnetic garnet crystalline film 12 to be efficiently released out of the external heat conducting cover 3 through the first heat conductive plates 6 and 7 and second heat conductive plates 8 and 9, consequently to ensure a large heat capacity and a wide heat radiation area. The structure exemplified in FIG. 1, which has a function of circumventing the effect of heat on the magnet 18, can prevent decrease in function of the magnet 18 due to the produced heat, so that efficient and effective heat dissipation can be fulfilled.

Although the heat produced in the magnetic garnet crystalline film 12 is somewhat transferred to the magnet 18, which is out of contact with, but in close to the magnetic garnet crystalline film, the produced heat can directly conduct from the magnetic garnet crystalline film to the second heat conductive plates 8 and 9 through the first heat conductive plates 6 and 7 and further to the outside of the external heat conducting cover 3 through the radiation fins 10 and 11. Thus, the heat can be steadily and efficiently released outward through the radiation fins 10 and 11, which are substantially out of contact with the principal parts of the heat-dissipating structure other than the isolator holder 2 and the outer grooves 4d and 5d of the first and second external heat conducting covers 4 and 5. As a consequence, the optical isolator can be prevented from increasing in temperature and deteriorating the optical characteristics due to the produced heat. In the heat conducting path from the magnetic garnet crystalline film 12, which is a heating source, to the outer grooves 4*d* and 5*d* of the external heat conducting cover 3, there are only the first heat conductive plates 6 and 7 and the second heat conductive plate 8 and 9 (including the radiation fins 10 and 11), but no other elements exist therein, so that the heat conducting path can be made short and simple, thus to gain excellent thermal responsiveness.

The isolator holder 2 is placed in the holder accommodating space 3*a* in the external heat conducting cover 3, leaving room spaces 20 and 21 thereinside and supported at two upper and lower points by the external heat conducting cover. The isolator holder is made of, for instance, stainless steel having low thermal conductivity. Thus, the optical isolator S is less influenced thermally in optical characteristics.

The radiation fins 10 and 11 are made flexible, so that any portion of the fin can be freely bent in any direction in assembling the optical isolator S. Since the radiation fins 10 and 11 are bendable even in the state of rising from the element holding case 1 as shown in FIG. 8 as one example, the radiation fins do not pose any impediment to assembling of the optical isolator. As well, since the radiation fins 10 and 11 are bendable even in the state of rising from the isolator holder 2 as shown in FIG. 2, the radiation fins do not pose any impediment to uniting of the first external heat conducting cover 4 with the second external heat conducting cover 5 to assemble the optical isolator, consequently to facilitate operations of positioning and uniting the outer end portions 10*a* and 11*a* of radiation fins relative to the outer grooves 4*d* and 5*d*.

The element holding case 1 is not limited to the groove shape formed over the entire length thereof, in so far as the guide openings 2*a* and 2*b* are open (upper side in FIG. 1). The element holding case 1 may have an interior configuration formed in a groove shape as long as the component elements 6, 7, 8, 9, 12, 13, 14, 15 and 16 can be held within the case. Furthermore, the opening formed over the entire length of the illustrated element holding case 1 may be closed with a lid having an opening for allowing the radiation fins 10 and 11 to pass therethrough. The component elements 6, 7, 8, 9, 12, 13, 14, 15 and 16 are housed collectively in the element holding case 1 so as to facilitate handling of these elements, but need not necessarily do so.

The external heat conducting cover 3 illustrated in FIG. 2 have the first external heat conducting cover element 4 formed in a cap and the second external heat conducting cover element 5, which are united fittingly with each other, so as to assemble the optical isolator S with ease. The external heat conducting cover 3 is not necessarily composed of a plurality of component elements as mentioned above, but may be made by using a single cylindrical body. The outer grooves 4*d* and 5*d* are not indispensable in the present invention, but possess an advantage of facilitating positioning of the outer end portions 10*a* and 11*a* of the radiation fins 10 and 11 and fittingly incorporating the radiation fins 10 and 11 in the cover.

The first heat conductive plates 6 and 7 may be made from diamond in such a manner that a diamond membrane layer is formed on either side of the magnetic garnet crystalline film 12 by an evaporation method or the like.

When the first heat conductive plates 6 and 7 are made by using the diamond membrane layer, the structure can be made thinner and more simple in comparison with a conventional structure using crystalline material such as GGG for the first heat conductive plates, achieving effects of suppressing rise in temperature due to the produced heat and ensuring stable optical characteristics.

The radiation fins 10 and 11 each may have a width equal to that of the second heat conductive plates 8 and 9.

The outer end portions 10*a* and 11*a* of the radiation fins 10 and 11 are fixed onto the bottoms of the outer grooves of the outer grooves 4*d* and 5*d* by the contact compensating means such as bonding with adhesive or welding, but the contact compensating means is not limited to these bonding methods.

Figure 16:
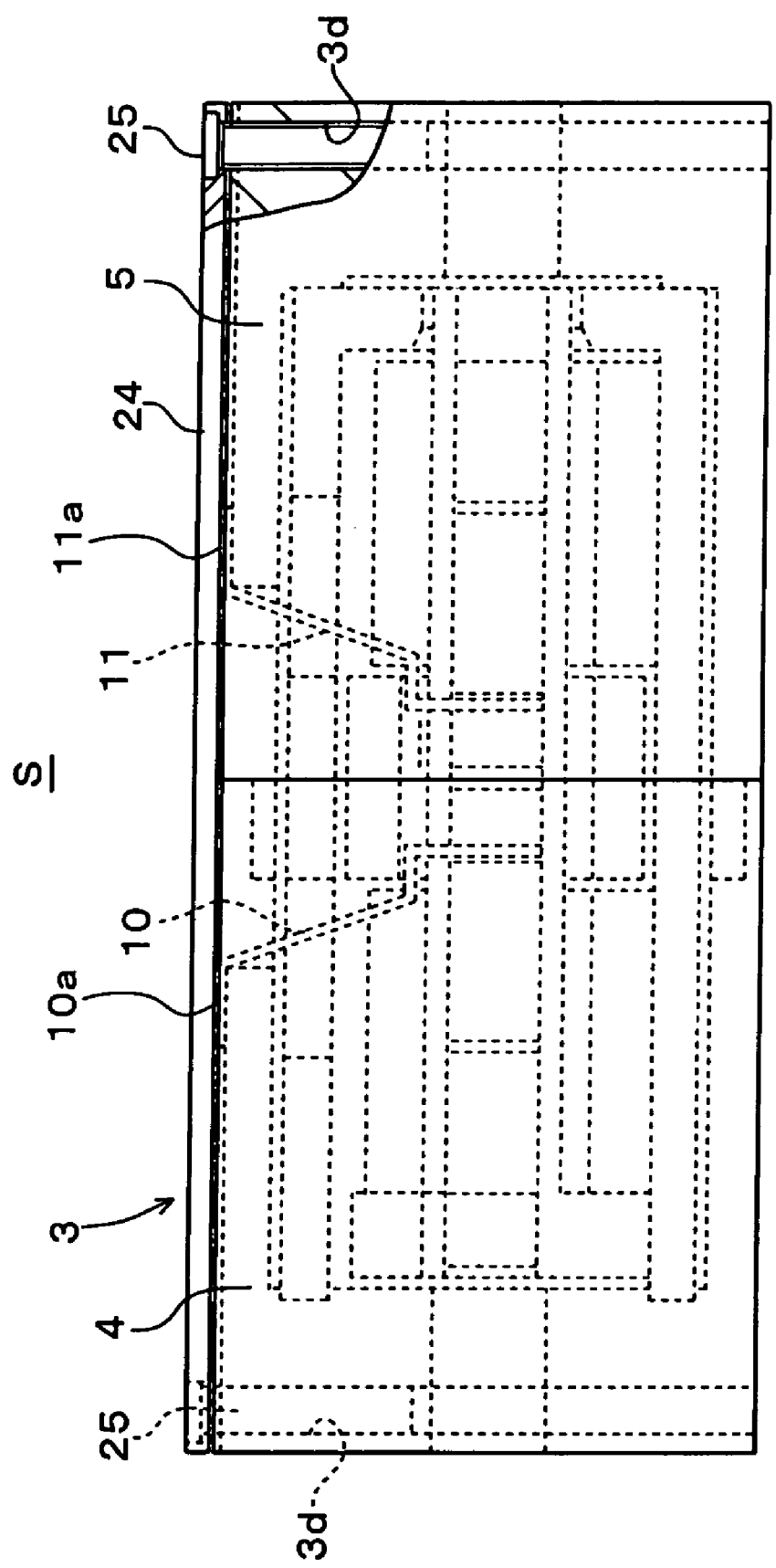
FIG. 16 is a partially cutaway enlarged front view showing the state of securing the outer end portions of radiation fins by a pressure plate in the heat-dissipating structure for an optical isolator according to the invention.

That is, the outer end portions 10*a* and 11*a* of the radiation fins 10 and 11 may be pressure-bonded by pressing the outer end portions of the radiation fins projecting upward out of the upper surface of the external heat conducting cover 3 shown in FIG. 1 by using a pressure plate 24 as illustrated in FIG. 16 by way of example.

The pressure plate 24 in the embodiment of FIG. 16 comes in pressure contact with the upper surfaces of the outer end portions 10*a* and 11*a* of the radiation fins 10 and 11 extending upward through the upper surface of the external heat conducting cover 3. The pressure plate 24 is secured onto the external heat conducting cover 3 by bolts 25. The bolts 25 are screwed into threaded bolt-holes 3*d* formed in four corners of the rectangular external heat conducting cover 3. The pressure plate 24 covers the entire upper surface of the external heat conducting cover 3.

The pressure plate 24 enables the outer end portions 10*a* and 11*a* of the radiation fins 10 and 11 to come in close contact with the bottom surfaces of the outer grooves 4*d* and 5*d* with a simple means.

Figure 17:
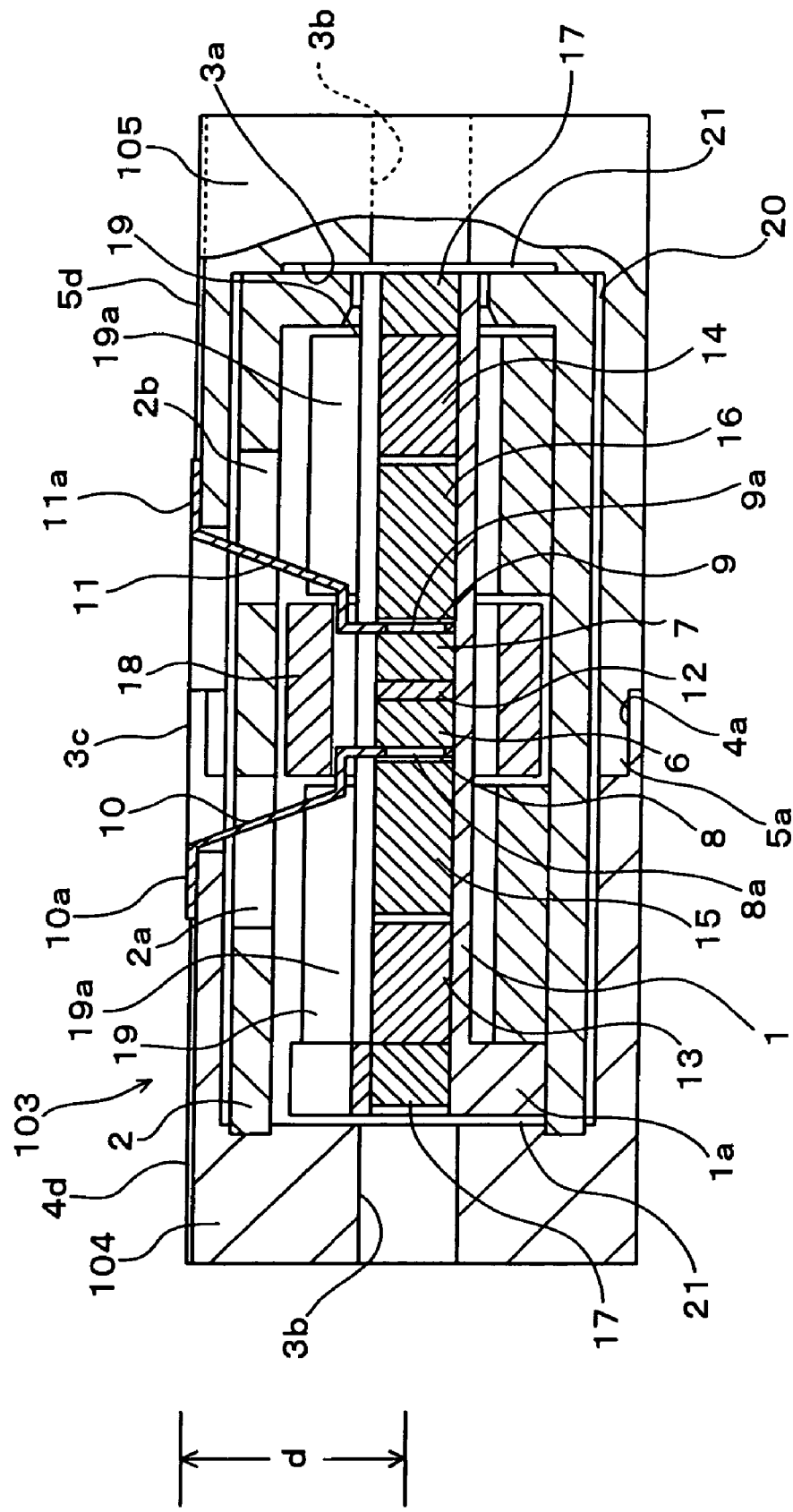
FIG. 17 is a front view showing another embodiment of the heat-dissipating structure for an optical isolator according to the invention, in which an external heat conducting cover is partially cut to reveal the interior.
Figure 18:
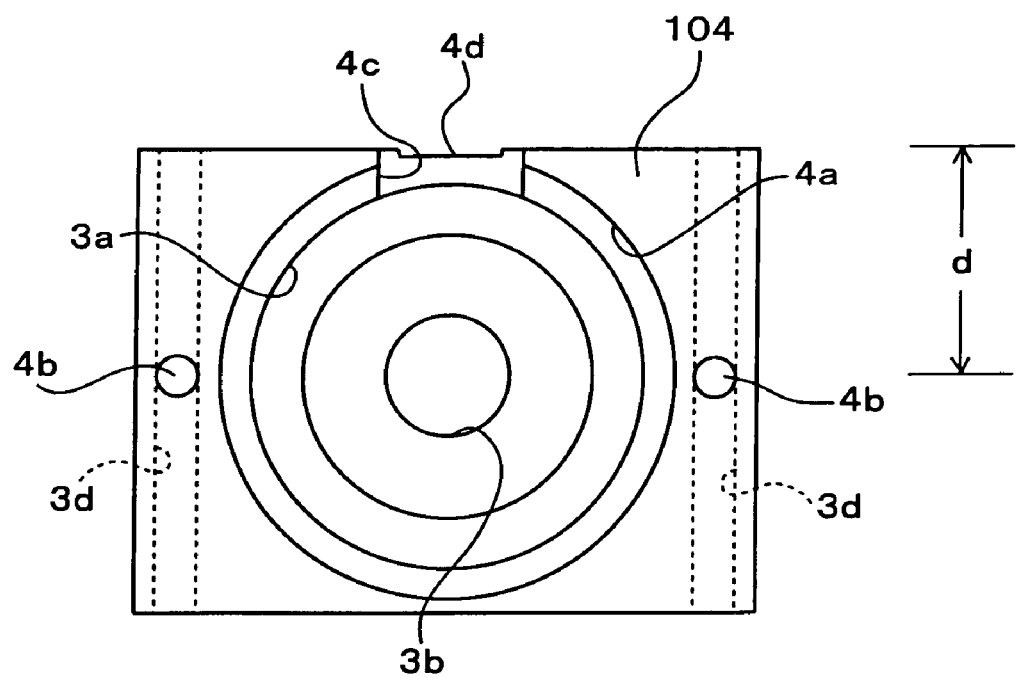
FIG. 18 is a side view showing a first external heat conducting cover portion of the external heat conducting cover in FIG. 17.
Figure 19:
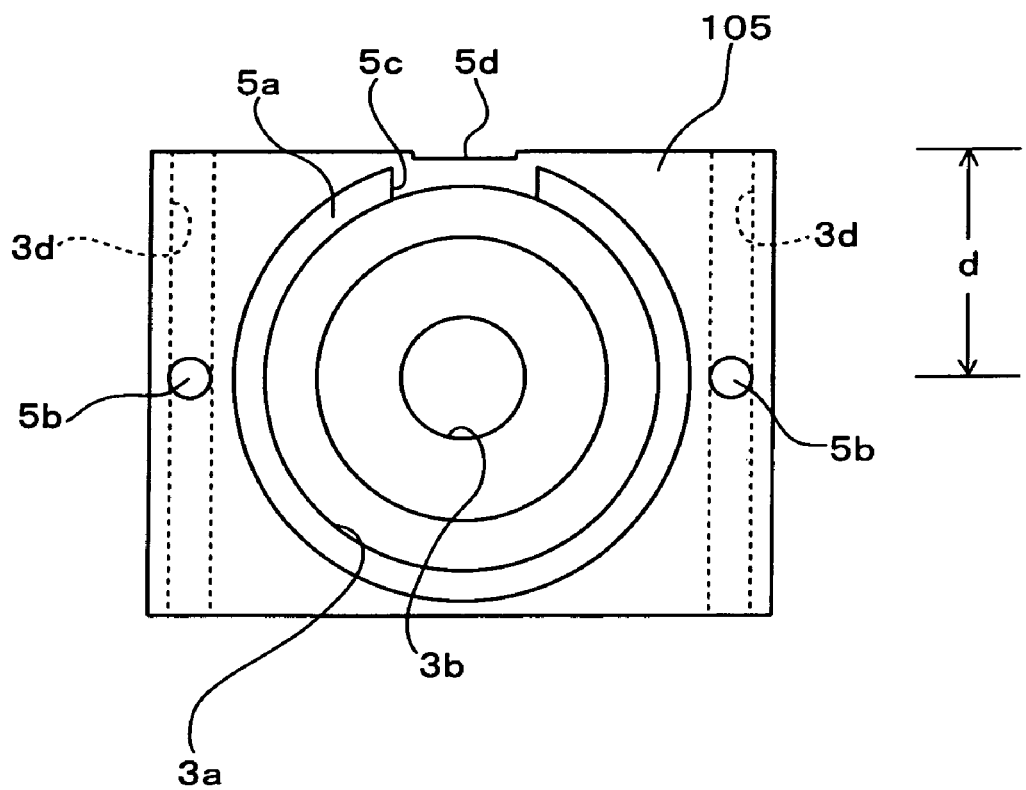
FIG. 19 is a side view showing a second external heat conducting cover portion of the external heat conducting cover in FIG. 17.

To shorten the heat conducting path in the optical isolator S shown in FIG. 17 to FIG. 19, the distance (d) from the centers to the upper surface of the first external heat conducting cover element 104 and second external heat conducting cover element 105 of the external heat conducting cover 103 is made shorter than those of the first external heat conducting cover element 4 and second external heat conducting cover element 5 of the external heat conducting cover 3 shown in FIG. 1.

Since the structure of the optical isolator S1 is identical with the optical isolator S except for the distance (d), the identical component elements of this embodiment are denoted by like numerical symbols for clarifying the correspondence relation with the optical isolator S.

Although the radiation fins 10 and 11 in the heat-dissipating structure shown in FIG. 1 are out of contact with the isolator holder 2, so as to make it harder to conduct the heat produced in the magnetic garnet crystalline film 12 to the isolator holder 2, it is desirable to determine the relation of thermal conductivity as described below.

It is preferable to determine the thermal conductivity of the first heat conductive plates 6 and 7 to be higher than that of the magnetic garnet crystalline film 12 and lower than that of the second heat conductive plates 8 and 9. The thermal conductivity of the second heat conductive plates 8 and 9 (including the radiation fins 10 and 11) is determined lower than that of the external heat conducting cover 3.

The heat conductive plates are aligned in the order from the heat conductive plate having high heat conductivity to the heat conductive member having low heat conductivity so as to transfer the heat produced in the magnetic garnet crystalline film 12 from the heat conductive member having low heat conductivity to the heat conductive member having high heat conductivity, thereby to decrease thermal resistance.

The heat produced in the magnetic garnet crystalline film 12 in the heat-dissipating structure shown in FIG. 1 is transferred from the first heat conductive plates 6 and 7 to the second heat conductive plates 8 and 9 having high thermal conductivity, which is identical to or higher than that of the first heat conductive plates and further to the radiation fins 10 and 11 of the second heat conductive plates and then dissipated from the radiation fins to the outer grooves 4*d* and 5*d* in the external heat conducting cover 3 having high thermal conductivity identical to or higher than that of the radiation fins.

Combination patterns of the first heat conductive plates 6 and 7, second heat conductive plates 8 and 9 and radiation fins 10 and 11 of the heat dissipation structure, which constitute a heat-dissipating device formed around the magnetic garnet crystalline film 12, are illustrated in FIG. 20A, FIG. 20B, FIG. 20C and FIG. 20D.

The combination pattern shown in FIG. 20A will be described. In this combination pattern, the magnetic garnet crystalline film 12 having a rotating angle of 45 degrees is formed on one side of the first heat conductive plate 7. The first heat conductive plate 7 in this combination pattern is integrated with the magnetic garnet crystalline film as noted above, but the other first heat conductive plate 6 is formed independently and brought in contact with the magnetic garnet crystalline film in assembling.

The first heat conductive plate 6 is made of a sapphire radiation plate, the first heat conductive plate 7 is made of a GGG substrate, and the magnetic garnet crystalline film 12 is made of a garnet with a GGG substrate. The radiation fins 10 and 11 are flexible.

The combination pattern shown in FIG. 20B will be described. The first heat conductive plate 6 and first heat conductive plate 7 in this combination pattern are respectively independent of the magnetic garnet crystalline film 12. The first heat conductive plate 6 and first heat conductive plate 7 are connected to or united with the magnetic garnet crystalline film in being assembled to be integrated with the magnetic garnet crystalline film. The first heat conductive plates 6 and 7 each are made of a sapphire radiation plate. The radiation fins 10 and 11 are flexible.

Figure 20A:
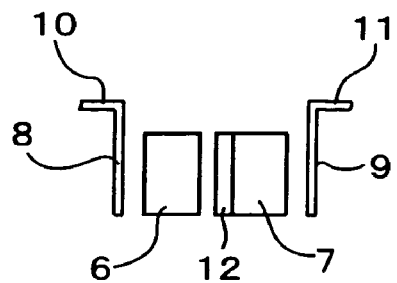
FIG. 20A, FIG. 20B, FIG. 20C and FIG. 20D show a combination pattern of elements constituting the principal part of the heat-dissipating structure for an optical isolator according to the invention.
Figure 20B:
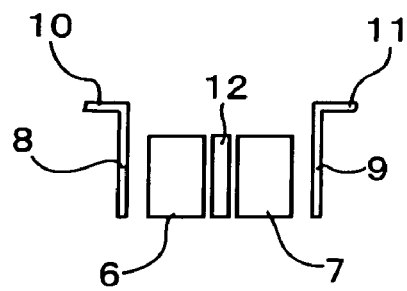

This combination pattern and the pattern shown in FIG. 20A are embodied according to the heat-dissipating structure shown in FIG. 1.

The combination pattern shown in FIG. 20C will be described. This combination pattern is composed of the magnetic garnet crystalline films 121 and 122, first heat conductive plates 61, 62, 71 and 72, and three second heat conductive plates 8, 9 and 26. The two magnetic garnet crystalline films 121 and 122 each have a rotating angle of 22.5 degrees.

That is, the magnetic garnet crystalline film 121 is formed on one side surface of the first heat conductive plate 71 and integrally united with the first heat conductive plate 71. The first heat conductive plate 61 is independent of the magnetic garnet crystalline film 121, but it comes in touch with the side surface of the magnetic garnet crystalline film in assembling. Likewise, the other magnetic garnet crystalline film 122 is also formed on one side surface of the first heat conductive plate 72 and integrally united with the first heat conductive plate 72. The magnetic garnet crystalline film 122 is independent of the first heat conductive plate 62, but it comes in touch with the first heat conductive plate 62 in assembling.

The first heat conductive plate 61 is in contact with the second heat conductive plate 8, and the first heat conductive plate 62 is in contact with the second heat conductive plate 9. The second heat conductive plate 26 is placed between the first heat conductive plate 71 and the first heat conductive plate 72. The second heat conductive plate 26 has its both side surfaces in contact with the opposite surfaces of the first heat conductive plates 71 and 72 to make use of the heat radiating function of the first heat conductive plates. The radiation fins extend upward from the second heat conductive plate 26. The first heat conductive plates 61 and 62 each are made of a sapphire radiation plate, the first heat conductive plates 71 and 72 each are made of a GGG substrate, and the magnetic garnet crystalline films 121 and 122 each are made of a garnet with a GGG substrate. The radiation fins 10, 11 and 27 are flexible. The tip end portions of the radiation fins 10, 11 and 27 are omitted in the drawings.

The combination pattern shown in FIG. 20D will be described. The combination pattern is identical with the combination pattern shown in FIG. 20C except for the following difference and therefore will not be described in detail again.

The difference is that the magnetic garnet crystalline films 121 and 122 seen in the foregoing embodiment are not formed on the side surfaces of the first heat conductive plates 71 and 72 in this combination pattern.

That is, the first heat conductive plates 61 and 71 are independent of the magnetic garnet crystalline film 121. The first heat conductive plates 61 and 71 are integrally united with the magnet garnet crystalline film 121 in assembling. The first heat conductive plates 62 and 72 are independent of the other magnetic garnet crystalline film 122. The first heat conductive plates 62 and 72 are integrally united with the magnet garnet crystalline film 122 in assembling.

Figure 20C:
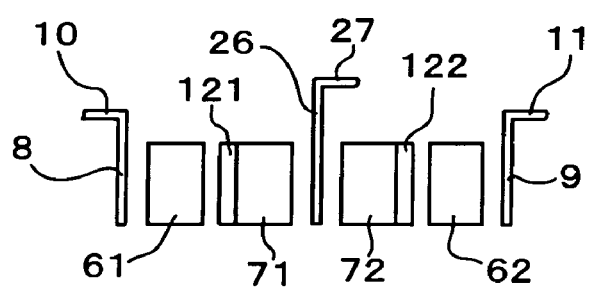
Figure 20D:
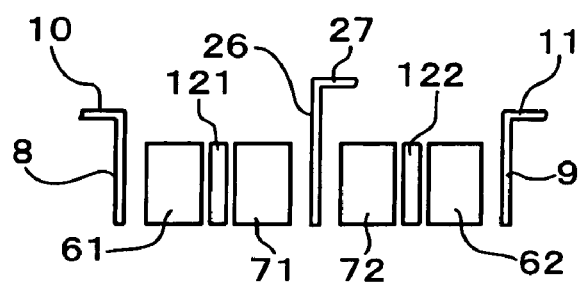

This combination pattern and the combination pattern shown in FIG. 20C are application examples making use of the heat-dissipating structure shown in FIG. 1.

Other combination patterns are illustrated in FIG. 21A, FIG. 21B, FIG. 21C and FIG. 21D.

The illustrated combination patterns are featured by using four or more second heat conductive plates to effectively dissipate the heat produced in the magnetic garnet crystalline film.

The combination pattern shown in FIG. 21A will be described.

This combination pattern has a characteristic structure in which two second heat conductive plates 26 and 28 are placed between the opposed first heat conductive plate 71 and first heat conductive plate 72. The other components in this combination pattern are substantially identical with those in the pattern shown in FIG. 20C.

One of the second heat conductive plates 26 and 28, i.e. the second heat conductive plate 28, in this combinational patter is in touch with the first heat conductive plate 71, and the other heat conductive plate 26 is in touch with the first heat conductive plate 72. The second heat conductive plates 26 and 28 serve as independent heat dissipation means so as to absorb the heat from the first heat conductive plates 71 and 72, thus to obtain enhanced heat dissipation effect.

The combination pattern shown in FIG. 21B will be described.

This combination pattern has a characteristic structure in which two second heat conductive plates 26 and 28 are placed between the opposed first heat conductive plate 71 and first heat conductive plate 72. The other components in this combination pattern are substantially identical with those in the pattern shown in FIG. 20D.

One of the second heat conductive plates 26 and 28, i.e. the second heat conductive plate 28, in this combinational patter is in touch with the first heat conductive plate 71, and the other heat conductive plate 26 is in touch with the first heat conductive plate 72. The second heat conductive plates 26 and 28 serve as independent heat dissipation means so as to absorb the heat from the first heat conductive plates 71 and 72.

The radiation fins 27 and 29 extend upward from the second heat conductive plates 26 and 28. The tip end portions of the radiation fins 27 and 29 are omitted in the drawings.

The two second heat conductive plates 26 and 28 serve as heat dissipation means so as to absorb the heat from the first heat conductive plates 71 and 72, thus to obtain enhanced heat dissipation effect.

The combination pattern shown in FIG. 21C will be described.

Figure 21A:
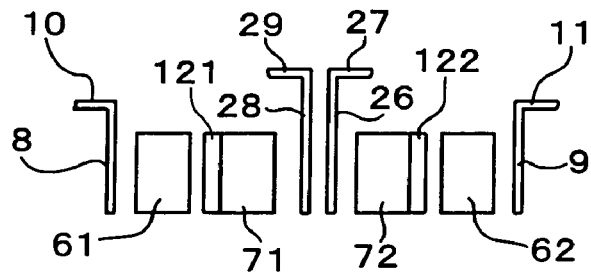
FIG. 21A, FIG. 21B, FIG. 21C and FIG. 21D show another combination pattern of elements constituting the principal part of the heat-dissipating structure for an optical isolator according to the invention.

This combination pattern is an application example based on the aforementioned combination pattern shown in FIG. 21A.

This combination pattern features the second heat conductive plates 30 and 32 placed on the outsides of the second heat conductive plates 8 and 9, which serve as heat dissipation means. The other components in this combination pattern are substantially identical with those in the pattern shown in FIG. 21A.

One of the second heat conductive plates 30 and 32, i.e. the second heat conductive plate 30, in this combinational patter is placed on the side of the first heat conductive plate 61 and in touch with the adjacent second heat conductive plate 8. The other second heat conductive plate 32 is placed on the side of the first heat conductive plate 62 and in touch with the adjacent second heat conductive plate 9.

Figure 21B:
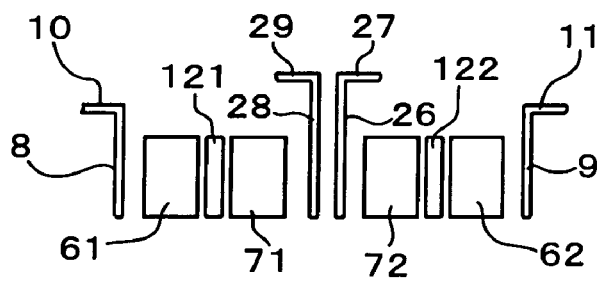
Figure 21C:
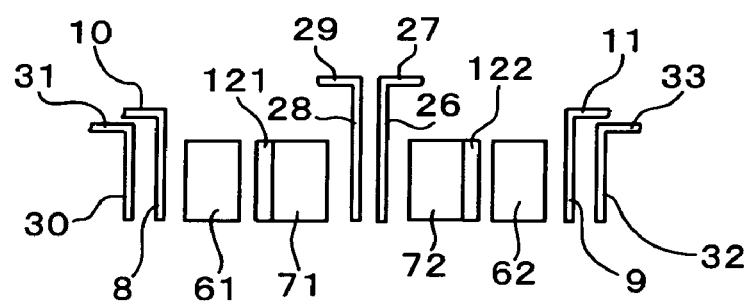

The two second heat conductive plates 8 and 30 placed on the left in FIG. 21C serve to absorb the heat from the first heat conductive plate 61. As well, the two second heat conductive plates 9 and 32 placed on the right in FIG. 21C serve to absorb the heat from the first heat conductive plate 62.

The radiation fins 31 and 33 extend upward from the second heat conductive plates 30 and 32. The tip end portions of the radiation fins 31 and 33 are omitted in the drawings.

The two second heat conductive plates 8 and 30 on the left side in the illustrated combination pattern and the two second heat conductive plates 9 and 32 on the right side of the same serve as heat dissipation means, thus to obtain enhanced heat dissipation effect.

The combination pattern shown in FIG. 21D will be described.

This combination pattern is an application example based on the aforementioned combination pattern shown in FIG. 21B.

The combination pattern is identical with the combination pattern shown in FIG. 21C except for the following difference and therefore will not be described in detail again.

The difference is that the magnetic garnet crystalline films 121 and 122 seen in the foregoing embodiment are not formed on the side surfaces of the first heat conductive plates 71 and 72 in this combination pattern (in other words, the first heat conductive plates are not integrally united with the magnetic garnet crystalline films 121 and 122).

One of the second heat conductive plates 30 and 32, i.e. the second heat conductive plate 30, in this combinational patter is placed on the side of the first heat conductive plate 61 and in touch with the adjacent second heat conductive plate 8. The other second heat conductive plate 32 is placed on the side of the first heat conductive plate 62 and in touch with the adjacent second heat conductive plate 9.

Figure 21D:
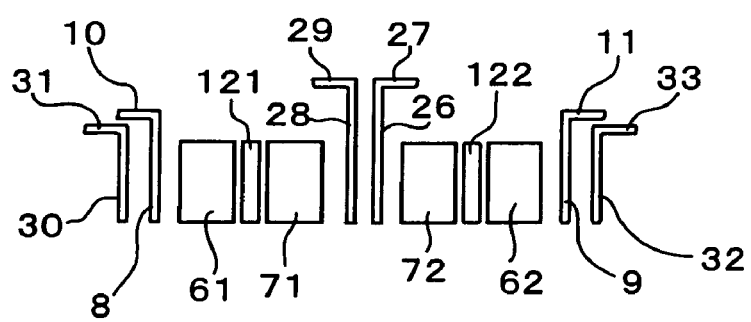

The two second heat conductive plates 8 and 30 placed on the left in FIG. 21D serve to absorb the heat from the first heat conductive plate 61. As well, the two second heat conductive plates 9 and 32 placed on the right in FIG. 21D serve to absorb the heat from the first heat conductive plate 62. The radiation fins 31 and 33 extend upward from the second heat conductive plates 30 and 32.

The heat dissipation efficiency according to this combinational patter is the same as that in FIG. 21C.

In the combination pattern shown in FIG. 21A, 21B, 21C and FIG. 21D, the magnetic garnet crystalline film 121 and the first heat conductive plates 61 and 71 placed astride the film 121 are formed as one unit, and similarly, the magnetic garnet crystalline film 122 and the first heat conductive plates 62 and 72 placed astride the film 122 are formed as another unit. Between the both units, a plurality (two in the illustrated embodiment) of second heat conductive plates 26 and 28 are placed. As a result, the combination pattern brings about an enhanced heat dissipation effect.

The aforementioned combination patterns shown in FIGS. 21C and 21D each have a plurality of (two in the illustrated embodiment) of second heat conductive plates 8 and 30 and a plurality of (two in the illustrated embodiment) of second heat conductive plates 9 and 32, which serve as external heat dissipation means, thus to obtain further enhanced heat dissipation effect.

A process of assembling the optical isolator using the combination pattern shown in FIG. 21A to compose the optical isolator of FIG. 21C will be described with reference to FIG. 22, FIG. 23A and FIG. 23B.

In the illustrated embodiment for assembling the optical isolator of the invention, the component elements such as the element holding case, isolator holder, external heat conducting cover, outer grooves, magnet, spacers and opening groove are substantially equivalent to the element holding case 1, isolator holder 2, external heat conducting cover 3, outer grooves 4d and 5d, magnet 18, spacers 19 and opening groove 19a shown in FIG. 1. Therefore, like elements in this embodiment are given by like reference numerals in FIG. 1, for clarifying the correspondence relation.

The component elements of the optical isolator shown in FIG. 1 are set in array in such a state the first lens 13, first doubly refracting crystal plate 15, second heat conductive plate 8, first heat conductive plate 6, magnetic garnet crystalline film 12, first heat conductive plates 7, second heat conductive plate 9, second doubly refracting crystal plate 16 and second lens 14 are lined up in order in a direction from left to right.

Figure 22:
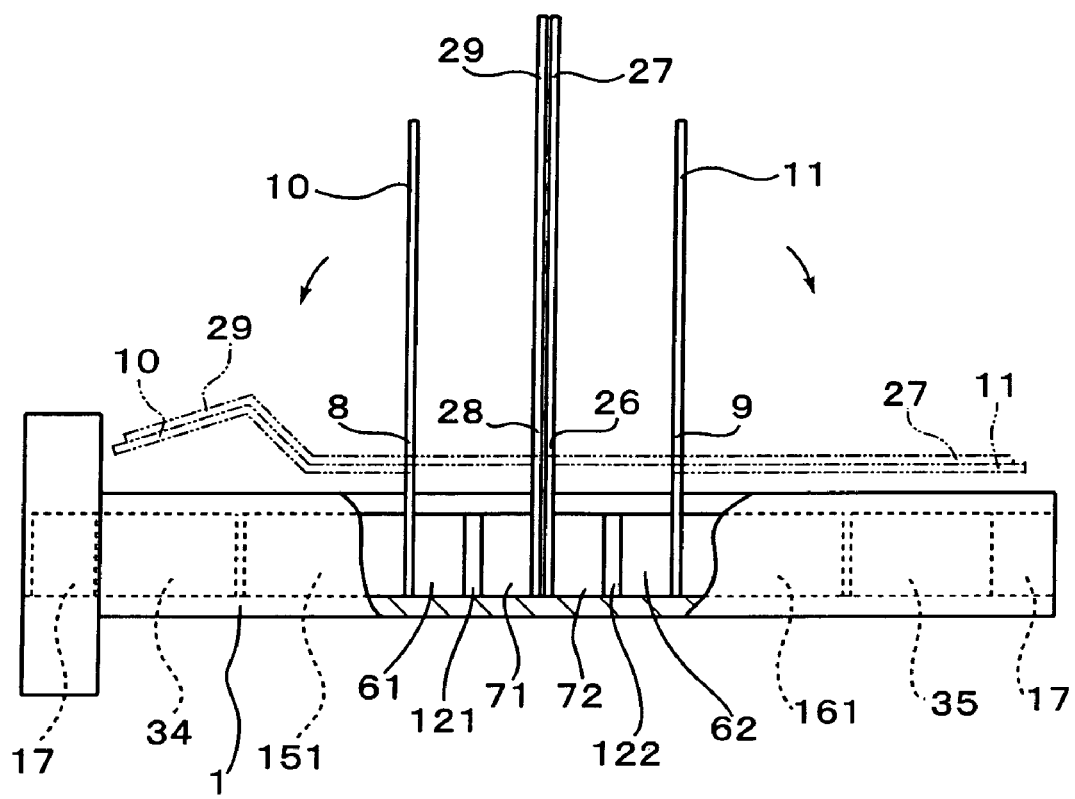
FIG. 22 is a partially cutaway front view showing an assembling process of the heat-dissipating structure for an optical isolator of FIG. 21A, in which the elements are assembled in the element holding case.

The optical isolator shown in FIG. 22 employs polarizers 34 and 35 in addition to the first lens 13 and second lens 14. That is, the polarizer 34 may be replaced with the first doubly refracting crystal plate, the aforementioned doubly refracting crystal plate 15 may be replaced with the second doubly refracting crystal plate 151, the second doubly refracting crystal plate 16 may be replaced with the third doubly refracting crystal plate 161, and the polarizer 35 may be replaced with the fourth doubly refracting crystal plate.

In the process of assembling the optical isolator, as shown in FIG. 22, the first doubly refracting crystal plate 34, second doubly refracting crystal plate 151, second heat conductive plate 8, first heat conductive plate 61, first heat conductive plate 71 integrally united with magnetic garnet crystalline film 121, second heat conductive plates 28 and 26, first heat conductive plate 72 integrally united on its right side with magnetic garnet crystalline film 122, first heat conductive plate 62, second heat conductive plate 9, third doubly refracting crystal plate 161 and fourth doubly refracting crystal plate 35 are aligned in order within the element holding case 1 in the direction from the incident side (left side in the drawing) to the emission side.

Of course, the present invention is not specifically limited to the aforementioned process of assembling the optical isolator.

After assembling, the aforementioned component elements are secured within the element holding case 1 by means of the stoppers 17.

Since the second heat conductive plates 8, 9, 26 and 28 have the radiation fins 10, 11, 27 and 29 in their upright state at the time of assembling, the radiation fins are bent outward at their lower end portions as depicted by a chain line in FIG. 22. That is, the second heat conductive plate 8 placed on the left in FIG. 22 and the second heat conductive plate 28 placed on the left side of the center are bent counterclockwise around their lower ends, and the radiation fins 10 and 29 are bent into a chevron shape as depicted by a chain line in the drawing. Also, the second heat conductive plate 9 placed on the right in FIG. 22 and the second heat conductive plate 26 placed on the right side of the center are bent clockwise around their lower ends, and the radiation fins 11 and 27 are parallel to the element holding case 1 as depicted by a chain line in the drawing.

Figure 23A:
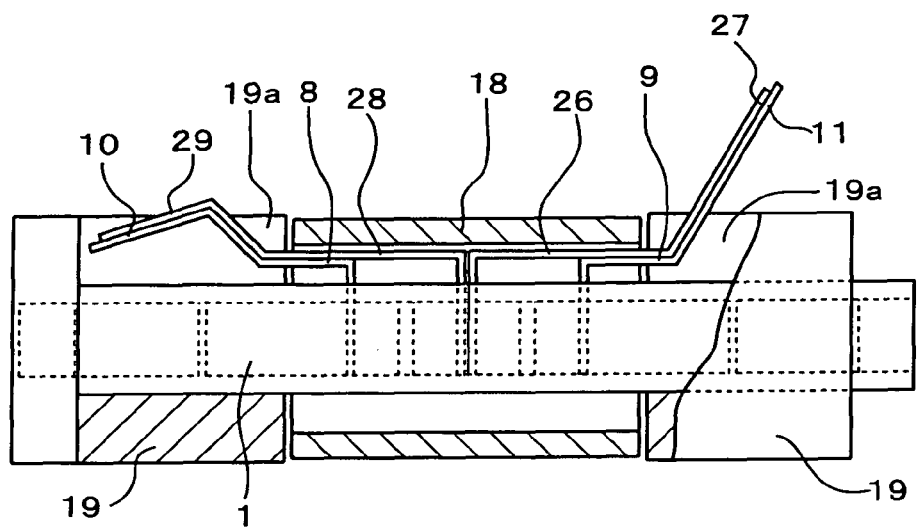
FIG. 23A and FIG. 23B are partially cutaway front views showing an assembling process of the heat-dissipating structure for an optical isolator of FIG. 21A, in which a process of assembling a spacer and a magnet into the outer periphery of the element holding case with the radiation fins being bent is shown in FIG. 23A, and a process of bringing the leading ends of the radiation fins in contact with the outer groove in the external heat conducting cover in the state of bending the leading ends of the radiation fins is shown in FIG. 23B.

Next, the magnet 18 and spacers 19 are mounted on the outer periphery of the element holding case 1 as shown in FIG. 23A. When mounting the magnet 18, the second heat conductive plates 8 and 28 and second heat conductive plates 9 and 26 are piled on top of another within the element holding case 1 in the horizontally bent state without disturbing insertion of the magnet thereinto. Then, the radiation fins 11 and 27 extending rightward in the drawing are bent upward while raising the second heat conductive plates 9 and 26 on the right side from a portion out of contact with the end of the magnet 18 as shown in FIG. 23A.

Figure 23B:
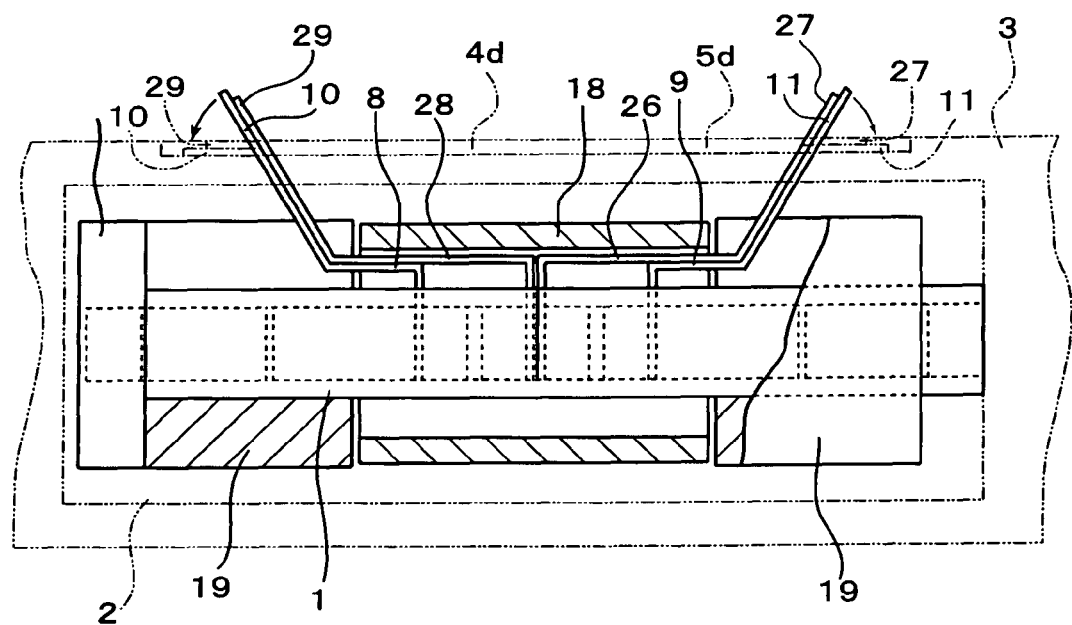

Thereafter, while depressing downward the second heat conductive plates 9 and 26 on the right side against an energizing force, the isolator holder 2 is inserted into the element holding case 1 from the right toward the left in FIG. 23B, and then, the leading end portions of the radiation fins 10 and 29 on the left in the drawing are extracted outward from the isolator holder while pulling the leading end portions of the radiation fins 11 and 27.

After pulling out the fins, upon placing the external heat conducting cover 3 on top of the isolator holder 2, the respective leading end portions of the radiation fins 10 and 29 and radiation fins 11 and 27 are bent to be brought in contact with the outer grooves 4d and 5d.

A process of assembling the optical isolator using the combination pattern shown in FIG. 21C will be described with reference to FIG. 24 and FIG. 25.

In the illustrated embodiment for assembling the optical isolator of the invention, the component elements such as the element holding case, magnet, spacers and opening groove are substantially equivalent to the element holding case 1, magnet 18, spacer 19 and opening groove 19a in the foregoing embodiments. Therefore, like elements in this embodiment are given by like reference numerals for clarifying the correspondence relation. The component elements of the optical isolator are set in array in such a state the first lens 13, the first doubly refracting crystal plate 15, one of second heat conductive plates 8, one of the first heat conductive plates 6, magnetic garnet crystalline film 12, the other first heat conductive plate 7, the other second heat conductive plate 9, the second doubly refracting crystal plate 16 and the second lens 14 are lined up in order in a direction from left to right as shown in FIG. 1.

Figure 24:
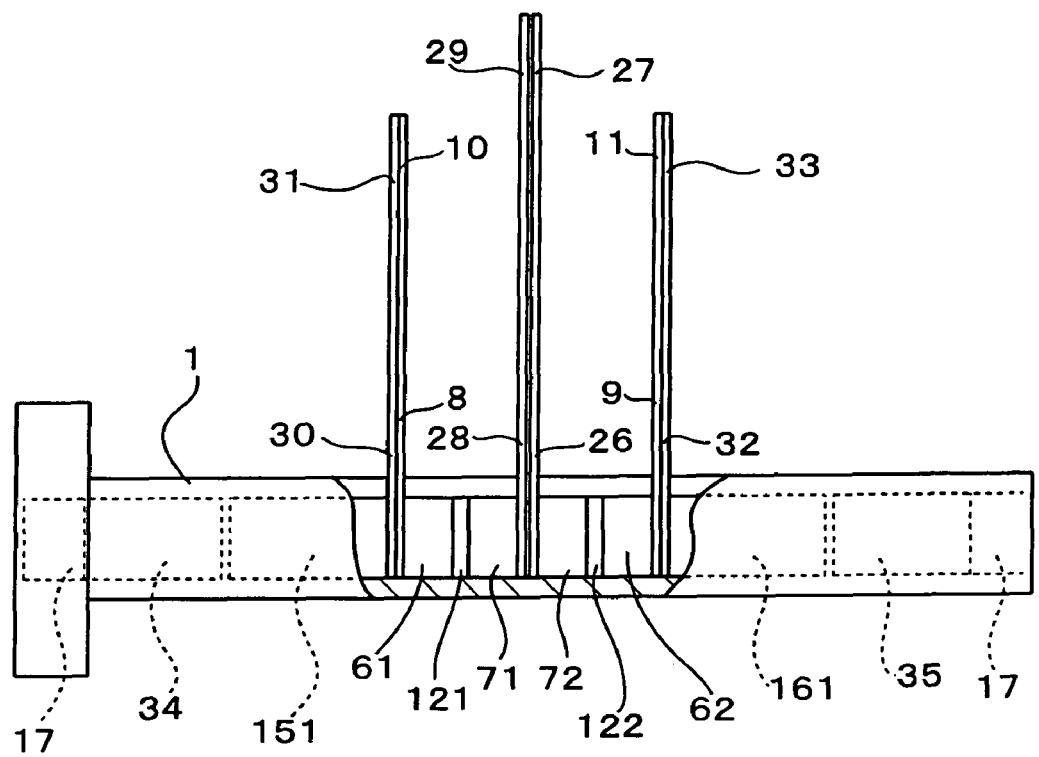
FIG. 24 is a partially cutaway front view showing an assembling process of the heat-dissipating structure for an optical isolator of FIG. 21C, in which the elements are assembled in the element holding case.

The optical isolator shown in FIG. 24 employs polarizers 34 and 35 in addition to the first lens 13 and second lens 14. That is, the polarizer 34 may be replaced with the first doubly refracting crystal plate, the aforementioned doubly refracting crystal plate 15 may be replaced with the second doubly refracting crystal plate 151, the second doubly refracting crystal plate 16 may be replaced with the third doubly refracting crystal plate 161, and the polarizer 35 may be replaced with the fourth doubly refracting crystal plate.

In the process of assembling the optical isolator, as shown in FIG. 24, the first doubly refracting crystal plate 34, second doubly refracting crystal plate 151, second heat conductive plate 8, first heat conductive plate 61, first heat conductive plate 71 integrally united with magnetic garnet crystalline film 121, second heat conductive plates 28 and 26, first heat conductive plate 72 integrally united with magnetic garnet crystalline film 122, first heat conductive plate 62, second heat conductive plates 9 and 32, third doubly refracting crystal plate 161 and fourth doubly refracting crystal plate 35 are aligned in order within the element holding case 1 in the direction from the incident side (left side in the drawing) to the emission side.

Of course, the present invention is not specifically limited to the aforementioned process of assembling the optical isolator.

After assembling, the aforementioned component elements are secured within the element holding case 1 by means of the stoppers 17. Since the second heat conductive plates 8, 9, 26, 28, 30 and 32 have the radiation fins 10, 11, 27, 29, 31 and 33 in their upright state at the time of assembling, the radiation fins are bent outward at their lower end portions. That is, the second heat conductive plates 8 and 30 placed on the left in FIG. 24 and the second heat conductive plate 28 placed on the left side of the center are bent counterclockwise around their lower ends. The bending is terminated when they become parallel to the element holding case 1. Also, the second heat conductive plates 9 and 32 placed on the right in FIG. 24 and the second heat conductive plate 26 placed on the right side of the center are bent clockwise around their lower ends. The bending is terminated when they become parallel to the element holding case 1.

Figure 25:
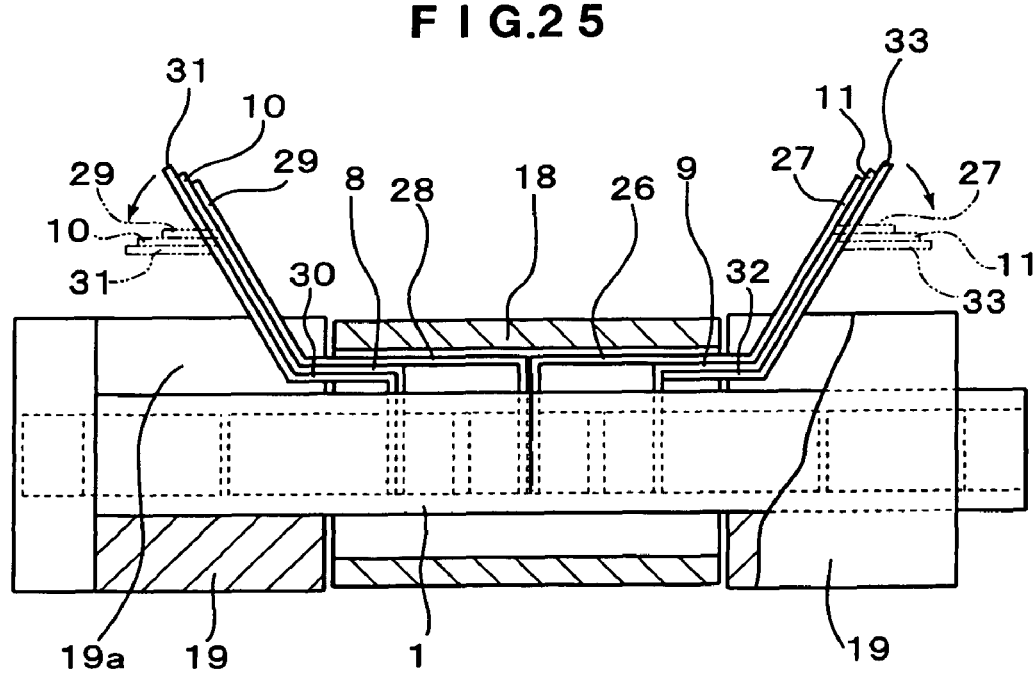
FIG. 25 is a partially cutaway front view showing an assembling process of the heat-dissipating structure for an optical isolator of FIG. 21C, in which a spacer and a magnet are assembled into the outer periphery of the element holding case with the radiation fins being bent.

Successively, the magnet 18 and spacers 19 are mounted within the element holding case 1 as illustrated in FIG. 25. When mounting the magnet 18, the second heat conductive plates 8, 28 and 30 and second heat conductive plates 9 and 26 are piled on top of another within the element holding case 1 in the horizontally bent state without disturbing insertion of the magnet thereinto. Then, the second heat conductive plates 8, 28 and 30, the second heat conductive plates 9, 26 and 32 and the magnet 18 are pulled up from a portion out of contact with the end of the magnet 18 as shown in FIG. 25.

Thereafter, the components are assembled in a not-illustrated manner similar to the assembling process shown in FIG. 23B. At the final stage of assembling, upon placing the external heat conducting cover on top of the isolator holder (not shown), the respective leading end portions of the radiation fins 10, 29 and 31 and radiation fins 11, 27 and 33 are bent horizontally to be brought in contact with the outer grooves in the external heat conducting cover.

Figure 26:
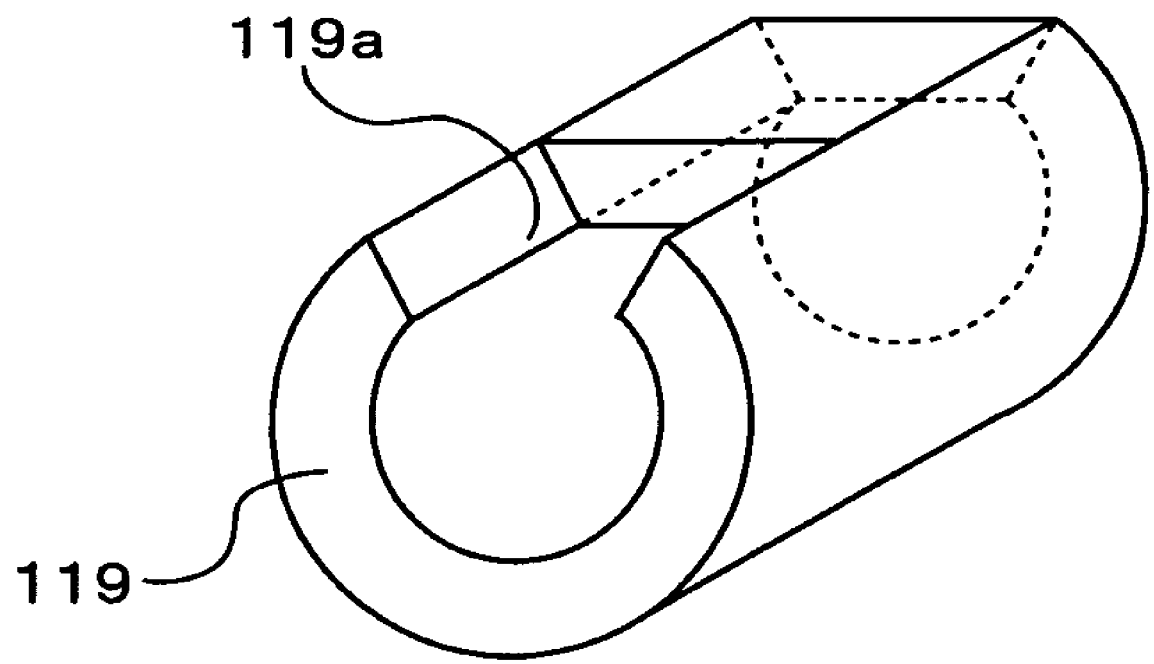
FIG. 26 is a perspective view showing another embodiment of the spacer in the heat-dissipating structure for an optical isolator according to the invention.

Although the opening groove in each spacer 19 in the embodiment shown in FIG. 11 is formed over the entire length of the spacer, the spacer 119 in this embodiment may be made to have a cutout 119a formed partially in the spacer so as to allow the radiation fins to pass through the spacer as shown in FIG. 26.

INDUSTRIAL APPLICABILITY

The heat-dissipating structure for an optical isolator according to the present invention is available for high power light, and therefore, useful in various technical fields such as the analytical medical field using a high-energy laser and other technical fields.

The invention claimed is:

1. A heat-dissipating structure for an optical isolator comprising:
 a magnetooptical crystalline film;
 first heat conductive members being formed on opposing sides of said magnetooptical crystalline film;
 second heat conductive members being placed adjacent to said first heart conductive members such that said first heat conductive members are located between said second heat conductive members and said magnetooptical crystalline film, said second heat conducting members having a hole for a light path;

radiation fins formed at a part of said second heat conductive members;

a magnet; and an isolator holder wherein said magnetooptical crystalline film, said first heat conductive members and said magnet are arranged within said isolator holder, said isolator holder being provided with guide openings for said radiation fins, wherein the heat-dissipating structure comprises an external heat conducting cover for said isolator holder, said guide openings in the isolator holder open toward said external heat conducting cover;

said external heat conducting cover has an opening through which the radiation fins extend, said radiation fins are flexible;

said radiation fins extend leaving a gap relative to said magnet and extend from said guide openings of the isolator holder without contacting the isolator holder to the outside of said external heat conducting cover through said opening in the external heat conducting cover and have their outer end portions in contact with the outside of said external heat conducting cover, and said isolator holder is in a holder accommodating space in said external heat conducting cover leaving space between the isolator holder and the external heat conducting cover.

2. The heat-dissipating structure for an optical isolator set forth in claim 1, wherein two units comprises said magnetooptical crystalline film and said first heat conductive members, said first heat conductive members being formed on the opposing sides of each magnetooptical crystalline film, said two units being disposed adjacent to each other, each of the two units having a first end adjacent to said other unit of the two units, and a second end away from said other unit of the two units; at least one said second heat conductive members is disposed between said first ends of said two units; and another of said second conductive members is adjacent to one of said second ends and disposed outside of the two units.

3. The heat-dissipating structure for an optical isolator set forth in claim 2, wherein at least two of said second heat conductive member are placed between said first ends of the two units.

4. The heat-dissipating structure for an optical isolator set forth in claim 3, wherein at lest two of said another of said second heat conductive members are placed on the outside of the two units and each of said another of said second heat conductive members is placed adjacent to one of said second ends.

5. The heat-dissipating structure for an optical isolator set forth in claim 1, wherein said second heat conductive members are made of heat conductive plates, and said radiation fins extend from said second heat conductive members.

6. The heat-dissipating structure for an optical isolator set forth in claim 1, wherein said isolator holder has said guide openings and contains an element holding case for holding said magnetic optical crystalline film, said first heat conductive members, said second heat conductive members and a polarizer.

7. The heat-dissipating structure for an optical isolator set forth in claim 6, wherein ring-shaped spacers are placed on either side of said magnet on the outer periphery of said element holding case, each of said spacers having an opening groove on a side of adjacent to each of said guide openings to allow each of said radiation fins to pass therethrough.

8. The heat-dissipating structure for an optical isolator set forth in claim 1, wherein an outer portion of said external heat conducting cover is provided with an outer groove continuously leading to said opening in the external heat conducting cover, and said radiation fins are in contact with the bottom surface of said outer groove.

9. The heat-dissipating structure for an optical isolator set forth in claim 1, wherein said first heat conductive members have a thermal conductivity higher than that of said magnetooptical crystalline film and lower than that of said second heat conductive members, and said second heat conductive members have a thermal conductivity lower than that of said external heat conducting cover.

10. The heat-dissipating structure for an optical isolator set forth in claim 1, wherein said external heat conducting cover comprises a cap-shaped first external heat conducting cover element and a cap-shaped second external heat conducting cover element, each of said first and second external heat conducting cover elements being each provided with an opening side and having a cutout hole for forming said opening in an end portion of said opening side of each of the first and second the external heat conducting cover elements.

11. The heat dissipating structure for an optical isolator set forth in claim 1, wherein a pressure plate is attached to the outer surface of said external heat conducting cover to come in pressure contact with the outer end portions of said radiation fins extending out of said external heat conducting cover.

* * * * *